US006243161B1

(12) United States Patent
Suzuki et al.

(10) Patent No.: US 6,243,161 B1
(45) Date of Patent: Jun. 5, 2001

(54) IMAGE-FORMING LIQUID MEDIUM CONTAINING MICROCAPSULES FILLED WITH DYES AND IMAGE-FORMING APPARATUS USING SUCH LIQUID MEDIUM

(75) Inventors: Minoru Suzuki, Tochigi; Hiroshi Orita; Hiroyuki Saito, both of Saitama; Katsuyoshi Suzuki; Koichi Furusawa, both of Tokyo, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/221,573

(22) Filed: Dec. 29, 1998

(30) Foreign Application Priority Data

Jan. 6, 1998 (JP) ............................................. 10-012136

(51) Int. Cl.[7] ........................ G03B 27/00; G03B 27/32; G03L 1/72

(52) U.S. Cl. .......................... 355/400; 355/32; 355/33; 430/138

(58) Field of Search ............................ 430/138; 355/32, 355/33, 400

(56) References Cited

U.S. PATENT DOCUMENTS

| | | | | |
|---|---|---|---|---|
| 4,399,209 | | 8/1983 | Sanders et al. . | |
| 4,644,376 | * | 2/1987 | Usami et al. | 346/215 |
| 4,833,488 | * | 5/1989 | Mizutani et al. | 346/76 |
| 5,108,867 | * | 4/1992 | Wing, Jr. et al. | 430/138 |
| 5,168,029 | * | 12/1992 | Igarashi et al. | 430/138 |
| 5,329,300 | | 7/1994 | Nishiyama . | |
| 5,645,920 | | 7/1997 | Nishiyama . | |
| 5,763,141 | * | 6/1998 | Shimomura et al. | 430/320 |
| 5,880,062 | * | 3/1999 | Sanders et al. | 503/201 |
| 5,923,412 | * | 7/1999 | Ertel | 355/400 |

FOREIGN PATENT DOCUMENTS 4-4960 1/1992 (JP) .

* cited by examiner

*Primary Examiner*—Russell Adams
*Assistant Examiner*—Khaled Brown
(74) *Attorney, Agent, or Firm*—Greenblum & Bernstein, P.L.C.

(57) ABSTRACT

An image-forming liquid medium comprised of a solution containing a surface-active agent, and at least two types of microcapsule mixed with the solution. A first type of microcapsule is filled with a first dye, and a second type of microcapsule is filled with a second dye. A first shell of the first type microcapsule is formed of a first resin that exhibits a first characteristic such that, when the first type microcapsule is squashed and broken under simultaneous application of a first pressure at a first temperature, the first dye seeps from the squashed and broken microcapsule. A second shell of the second type of microcapsule is formed of a second resin that exhibits a second characteristic such that, when the second type microcapsule is squashed and broken under simultaneous application of a second pressure at a second temperature, the second dye seeps from the squashed and broken microcapsule.

20 Claims, 14 Drawing Sheets

IMAGE-FORMING LIQUID MEDIUM CONTAINING MICROCAPSULES FILLED WITH DYES AND IMAGE-FORMING APPARATUS USING SUCH LIQUID MEDIUM

BACKGROUND OF THE INVENTION

1. Field of the Invention

The present invention relates to an image-forming liquid medium containing microcapsules filled with dye or ink, and to an image-forming apparatus that forms an image on a sheet of recording paper by selectively developing monochromatic dots, when using such an image-forming liquid medium, in accordance with a series of digital image-pixel signals.

2. Description of the Related Art

Conventionally, an image-forming system, using an image-forming sheet coated with a layer of microcapsules filled with dye or ink, is known. In this image-forming sheet, a shell of each microcapsule is formed of a suitable photo-setting resin, and an optical image is recorded and formed as a latent image on the layer of microcapsules by exposing it to light rays in accordance with image-pixel signals. Then, the latent image is developed by exerting pressure on the microcapsule layer. Namely, the microcapsules, which are not exposed to the light rays, are squashed and broken, whereby the dye or ink seeps out of the squashed and broken microcapsules, and thus the latent image is visually developed by the seepage of the dye or ink.

Of course, in this conventional image-forming system, it is impossible to form an image on a sheet of ordinary printing paper without the layer of microcapsules. Nevertheless, usually, only a small portion of the microcapsules included in the layer contributes to the formation of an image on the image-forming sheet. In other words, a large portion of the microcapsules included in the layer are not utilized for the formation of an image on the image-forming sheet. Thus, in the conventional image-forming system, a large amount of ink or dye, encapsulated in the microcapsules, is wastefully consumed by not taking part in the formation of an image.

Also, each of the image-forming sheets must be packed so as to be protected from being exposed to light, resulting in wastage of materials. Further, the image-forming sheets must be handled such that they are not subjected to excess pressure due to the softness of unexposed microcapsules, resulting in an undesired seepage of the dye or ink.

SUMMARY OF THE INVENTION

Therefore, an object of the present invention is to provide a novel image-forming liquid medium containing a plurality of microcapsules filled with dye or ink, by which an image can be formed on a sheet of recording paper.

Another object of the present invention is to provide an image-forming apparatus that forms an image on a sheet of recording paper by selectively generating dots, when using the above-mentioned image-forming liquid medium, in accordance with a series of digital image-pixel signals, thereby developing monochromatic dots on a sheet of recording paper by squashing and breaking the microcapsules included in each drop.

In accordance with an aspect of the present invention, there is provided an image-forming liquid medium comprising a solution that contains a surface-active agent; and at least two types of microcapsule: a first type of microcapsule filled with a first dye, and a second type of microcapsule filled with a second dye, which are homogeneously mixed with the solution. The first type of microcapsule exhibits a first pressure/temperature characteristic such that, when the first type of microcapsule is squashed and broken under a first predetermined pressure at a first predetermined temperature, the first dye seeps from the squashed and broken microcapsule, and the second type of microcapsule exhibits a second pressure/temperature characteristic such that, when the second type of microcapsule is squashed and broken under a second predetermined pressure at a second predetermined temperature, the second dye seeps from the squashed and broken microcapsule.

The image-forming liquid medium may further comprise a third type of microcapsule filled with a third dye mixed with the solution together with the first and second types of microcapsule, and the third type of microcapsule exhibits a third pressure/temperature characteristic such that, when the third type of microcapsule is squashed and broken under a third predetermined pressure at a third predetermined temperature, the third dye seeps from the squashed and broken microcapsule.

In this image-forming liquid medium, the first type of microcapsule may have a first shell wall composed of a first resin which exhibits the first pressure/temperature characteristic, the second type of microcapsule may have a second shell wall composed of a second resin which exhibits the second pressure/temperature characteristic, and the third type of microcapsule has a third shell wall composed of a third resin which exhibits the third pressure/temperature characteristic.

Preferably, each of the first, second and third resins exhibit transparency, and each of the first, second and third dyes exhibit transparency, with the solution exhibiting transparency and further comprising a color developer that reacts with each of the first, second and third dyes, thereby developing a predetermined monochromatic color. Preferably, the respective first, second and third dyes comprise a first leuco-pigment and a second leuco-pigment, respectively, and the respective first, second, and third dyes exhibit a cyan pigmentation, a magenta pigmentation and a yellow pigmentation.

In accordance with a second aspect of the present invention, there is provided an image-forming apparatus, using the image-forming liquid medium, as mentioned above, which comprises: a transfer unit that selectively transfers a small part of the image-forming liquid medium as a first fluid drop to a sheet of recording medium in accordance with a first digital monochromatic image-pixel signal, corresponding to the first dye, and that selectively transfers a small part of the image-forming liquid medium as a second fluid drop to the sheet of recording medium in accordance with a second digital monochromatic image-pixel signal, corresponding to the second dye; and a pressure/temperature applicator unit that applies the first predetermined pressure and the first predetermined temperature to the first fluid drop, and that applies the second predetermined pressure and the second predetermined temperature to the second fluid drop.

The transfer unit and the pressure/temperature applicator unit may be combined with each other as a single thermal head assembly.

In this case, the image-forming apparatus further comprises a platen member that is associated with the single thermal head assembly, and the single thermal head assembly includes: an electrically-insulated base member; a first movable thermal head provided in the base member and having a first array of heater elements aligned with each other; a second movable thermal head provided in the base member and having a second array of heater elements aligned with each other, the first array of heater elements being in parallel with the second array of heater elements; a spacer member, having an opening, securely provided on the base member such that the first and second thermal heads are encompassed by the opening of the spacer member; and a sheet of film that covers the spacer member such that the opening of the spacer member is defined as a liquid medium space that stores the image-forming liquid medium, the sheet of film including a plurality of pores formed therein, with the pores being aligned with each other in a first row and a second row, which extend along the first and second arrays of heater elements, respectively, such that each of the heater elements is associated with a corresponding pore, the first fluid drop being produced from one of the pores in the first row by heating a corresponding one of the heater elements in the first array to the first predetermined temperature, the second fluid drop being produced from one of the pores in the second row by heating a corresponding one of the heater elements in the second array to the second predetermined temperature, the platen member urging the first and second thermal heads toward the interposed sheet of film, the sheet of recording medium being interposed between the platen member and the sheet of film during the production of the first and second fluid drops. The single thermal head assembly further includes a first resilient member that is associated with the first thermal head such that the first thermal head is elastically biased against the sheet of film, backed by the platen member, under the first predetermined pressure; and a second resilient member that is associated with the second thermal head such that the second thermal head is elastically biased against the sheet of film, backed by the platen member, under the second predetermined pressure.

Preferably, the single thermal head assembly includes a reservoir that holds the image-forming liquid medium to feed the liquid medium space of the spacer member with the image-forming liquid medium.

In accordance with a third aspect of the present invention, there is provided an image-forming apparatus, using the image-forming liquid medium, as mentioned above, which comprises: a transfer unit that selectively transfers a small part of the image-forming liquid medium as a fluid drop to a sheet of recording medium in accordance with at least one of a first digital monochromatic image-pixel signal and a second digital monochromatic image-pixel signal, which correspond to the first and second dyes, respectively; and a pressure/temperature applicator unit that selectively applies the first predetermined pressure and the first predetermined temperature to the fluid drop in accordance with the first digital monochromatic image-pixel signal, and that applies the second predetermined pressure and the second predetermined temperature to the fluid drop in accordance with the second digital monochromatic image-pixel signal.

Preferably, the transfer unit is formed as a first thermal head assembly, and the pressure/temperature applicator unit is formed as a second thermal head assembly, the first and second thermal head assemblies being arranged so as to partially define a path along which the sheet of recording medium is moved, the first thermal head assembly being positioned upstream of the second thermal head assembly in a direction of the movement of the sheet of recording medium.

In the third aspect of the present invention, the image-forming apparatus may further comprises a first platen member that is associated with the transfer unit, and a second platen member that is associated with the pressure/temperature applicator unit.

In this case, the first thermal head assembly may include: a first electrically-insulated base member; a thermal head provided in the first electrically-insulated base member and having an array of heater elements aligned with each other; a spacer member, having an opening, securely provided on the first electrically-insulated base member such that the thermal head is encompassed by the opening of the spacer member; a sheet of film that covers the spacer member such that the opening of the spacer member is defined as a liquid medium space that stores the image-forming liquid medium, the sheet of film including a plurality of pores formed therein, with the pores being aligned with each other in a single row, which extends along the array of heater elements, such that each of the heater elements is associated with a corresponding pore. The first platen member urges the thermal head toward the interposed sheet of film, and the fluid drop is selectively produced from one of the pores by heating a corresponding one of the heater elements in the array to a predetermined temperature in accordance with at least one of the first and second digital monochromatic image-pixel signals, with the sheet of recording medium being interposed between the first platen member and the sheet of film during the production of the fluid drop.

On the other hand, the pressure/temperature applicator unit may include: a second electrically-insulated base member; a first movable thermal head provided in the base member and having a first array of heater elements aligned with each other; a second movable thermal head provided in the base member and having a second array of heater elements aligned with each other, the first array of heater elements being in parallel with the second array of heater elements, and the second platen member contacting the first and second thermal heads; a first resilient member that is associated with the first thermal head such that the first thermal head elastically contacts the second platen with the first predetermined pressure, during a passage of the sheet of recording medium carrying the fluid drop through a nip between the second platen member and the elastically-contacted first thermal head, a corresponding one of the heater elements in the first array being selectively heated to the first predetermined temperature in accordance with the first digital monochromatic image-pixel signal; and a second resilient member that is associated with the second thermal head such that the second thermal head elastically contacts the sheet of film with the second predetermined pressure, during a passage of the sheet of recording medium carrying the fluid drop through a nip between the second platen member and the elastically-contacted second thermal head, a corresponding one of the heater elements in the second array being selectively heated to the second predetermined temperature in accordance with the second digital monochromatic image-pixel signal.

BRIEF DESCRIPTION OF THE DRAWINGS

These objects and other objects of this invention will be better understood from the following description, with reference to the accompanying drawings in which.

DESCRIPTION OF THE PREFERRED EMBODIMENTS

Figure 1:
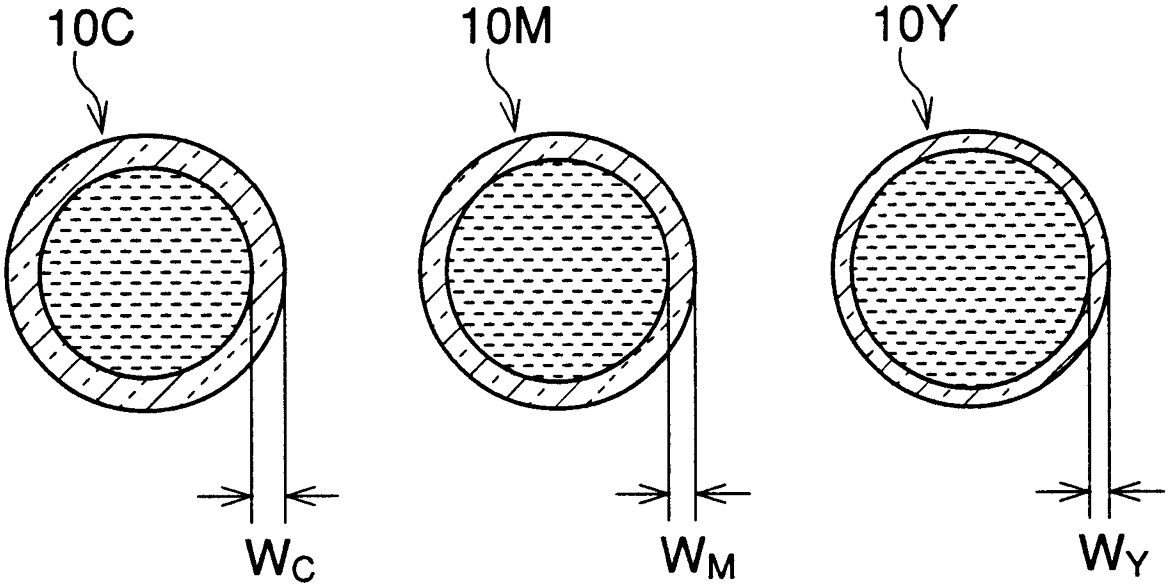
FIG. 1 is a schematic cross-sectional view showing three types of microcapsules: a cyan microcapsule filled with a cyan dye; a magenta microcapsule filled with a magenta dye; and a yellow microcapsule filled with a yellow dye, used to prepare an image-forming liquid medium according to the present invention.

FIG. 1 shows three types of microcapsules: a first type of microcapsule 10C filled with cyan liquid dye or ink, a second type of microcapsule 10M filled with magenta liquid dye or ink, and a third type of microcapsule 10Y filled with yellow liquid dye or ink, a plurality of which are utilized to prepare an image-forming liquid medium according to the present invention.

In each type of microcapsule (10C, 10M, 10Y), a shell wall of a microcapsule is formed of a suitable synthetic resin material. Also, in order to produce each of the types of microcapsules 10C, 10M and 10Y, a well-known polymerization method, such as interfacial polymerization, in-situ polymerization or the like, may be utilized, and the microcapsules 10C, 10M and 10Y may have an average diameter of several microns, for example, 1 $\mu$m to 5 $\mu$m.

In this embodiment, for the resin material of each type of microcapsule (10C, 10M, 10Y), a shape memory resin is utilized. For example, the shape memory resin is represented by a polyurethane-based-resin, such as polynorbornene, trans-1, 4-polyisoprene polyurethane. As other types of shape memory resin, a polyimide-based resin, a polyamide-based resin, a polyvinyl-chloride-based resin, a polyester-based resin and so on are also known.

Figure 2:
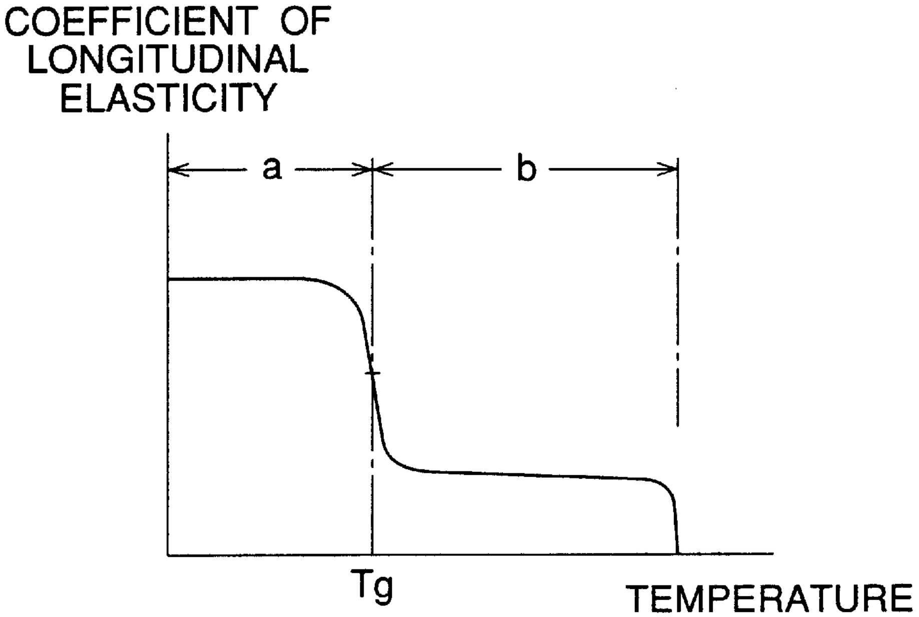
FIG. 2 is a graph showing a characteristic curve of a longitudinal elasticity coefficient of a shape memory resin forming a shell wall of the cyan, magenta and yellow microcapsules shown in FIG. 1.

In general, as shown in a graph of FIG. 2, the shape memory resin exhibits a coefficient of longitudinal elasticity, which abruptly changes at a glass-transition temperature boundary $T_g$. In the shape memory resin, Brownian movement of the molecular chains is stopped in a low-temperature area "a", which is below the glass-transition temperature $T_g$, and thus the shape memory resin exhibits a glass-like phase. On the other hand, Brownian movement of the molecular chains becomes increasingly energetic in a high-temperature area "b", which is above the glass-transition temperature $T_g$, and thus the shape memory resin exhibits a rubber elasticity.

The shape memory resin is named due to the following shape memory characteristic: once a mass of the shape memory resin is worked into a finished article in the low-temperature area "a", and is heated to beyond the glass-transition temperature $T_g$, the article becomes freely deformable. After the shaped article is deformed into another shape, and cooled to below the glass-transition temperature $T_g$, the most recent shape of the article is fixed and maintained. Nevertheless, when the deformed article is again heated to above the glass-transition temperature $T_g$, without being subjected to any load or external force, the deformed article returns to the original shape.

In this embodiment, the shape memory characteristic per se is not utilized, but the characteristic abrupt change of the shape memory resin in the longitudinal elasticity coefficient is utilized, such that the three types of cyan, magenta and yellow microcapsules 10C, 10M and 10Y can be selectively squashed and broken at a predetermined temperature and under a predetermined pressure.

Figure 3:
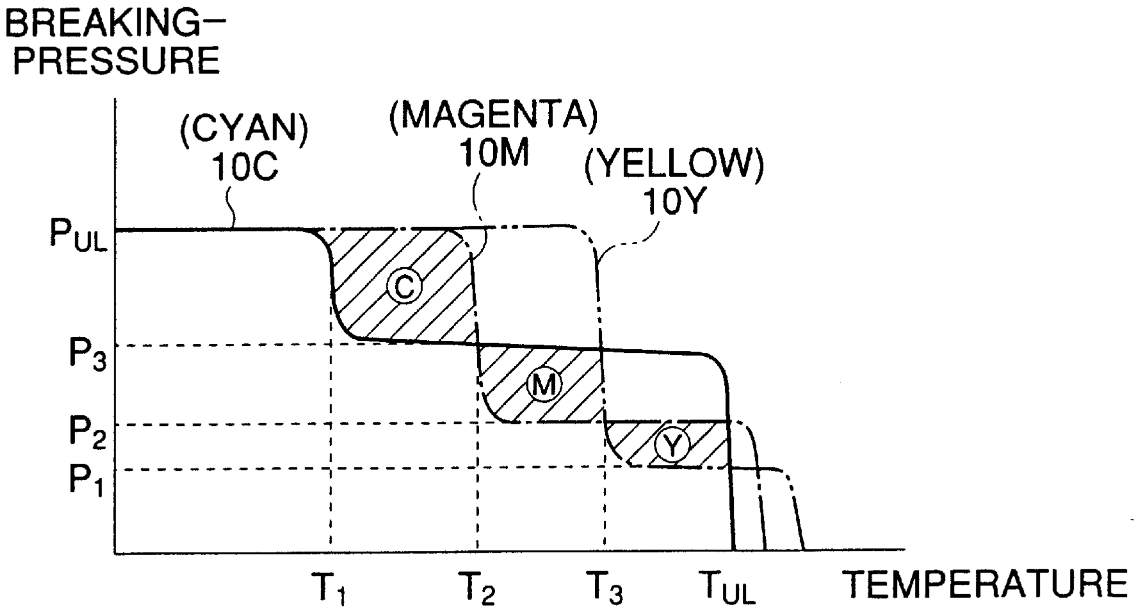
FIG. 3 is a graph showing pressure/temperature breaking characteristics of the respective cyan, magenta and yellow microcapsules shown in FIG. 1, with each of a cyan-developing area, a magenta-developing area and a yellow-developing area being indicated as a hatched area.

As shown in a graph of FIG. 3, a shape memory resin of the cyan microcapsule 10C is prepared so as to exhibit a characteristic longitudinal elasticity coefficient, indicated by a solid line, having a glass-transition temperature $T_1$; a shape memory resin of the magenta microcapsule 10M is prepared so as to exhibit a characteristic longitudinal elasticity coefficient, indicated by a single-chained line, having a glass-transition temperature $T_2$; and a shape memory resin of the yellow microcapsule 10Y is prepared so as to exhibit a characteristic longitudinal elasticity coefficient, indicated by a double-chained line, having a glass-transition temperature $T_3$.

Note, by suitably varying compositions of the shape memory resin and/or by selecting a suitable one from among various types of shape memory resin, it is possible to obtain the respective shape memory resins, with the glass-transition temperatures $T_1$, $T_2$ and $T_3$.

Also, as shown in FIG. 1, the microcapsule walls of the cyan microcapsule 10C, magenta microcapsule 10M, and yellow microcapsule 10Y, respectively, have differing thicknesses $W_C$, $W_M$ and $W_Y$. The thickness $W_C$ of the cyan microcapsule 10C is larger than the thickness $W_M$ of the magenta microcapsule 10M, and the thickness $W_M$ of the magenta microcapsule 10M is larger than the thickness $W_Y$ of the yellow microcapsule 10Y.

The wall thickness $W_C$ of the cyan microcapsule 10C is selected such that each cyan microcapsule 10C is compacted and broken under a breaking pressure that lies between a critical breaking pressure $P_3$ and an upper limit pressure $P_{UL}$ (FIG. 3), when each cyan microcapsule 10C is heated to a temperature between the glass-transition temperatures $T_1$ and $T_2$; the wall thickness $W_M$ of the magenta microcapsule 10M is selected such that each magenta microcapsule 10M is compacted and broken under a breaking pressure that lies between a critical breaking pressure $P_2$ and the critical breaking pressure $P_3$ (FIG. 3), when each magenta microcapsule 10M is heated to a temperature between the glass-transition temperatures $T_2$ and $T_3$; and the wall thickness $W_Y$ of the yellow microcapsule 10Y is selected such that each yellow microcapsule 10Y is compacted and broken under a breaking pressure that lies between a critical breaking pressure $P_1$ and the critical breaking pressure $P_2$ (FIG. 3), when each yellow microcapsule 10Y is heated to a temperature between the glass-transition temperature $T_3$ and an upper limit temperature $T_{UL}$.

Note, the upper limit pressure $P_{UL}$ and the upper limit temperature $T_{UL}$ are suitably set in view of the characteristics of the used shape memory resins.

According to the present invention, same amounts of the cyan, magenta and yellow microcapsules 10C, 10M and 10Y are homogeneously mixed with a suitable solution, such as a water solution, organic solution, or the like, containing a dispersant or surface-active agent to form a suspension, which is utilized as the image-forming liquid medium.

As is apparent from FIG. 1, preferably, the shape memory resins of the cyan, magenta and yellow microcapsules 10C, 10M and 10Y should be transparent. In this case, for respective cyan, magenta and yellow dyes to be encapsulated in the cyan, magenta and yellow microcapsules 10C, 10M and 10Y, cyan, magenta and yellow leuco-pigments are utilized, and color developer is contained in the solution. Usually, each leuco-pigment per se and the color developer pre se exhibit transparency, but the leuco-pigment develops a given monochromatic color (cyan, magenta, yellow) when chemically reacting with the color developer.

According to the present invention, the image-forming liquid medium is applied as a drop to a sheet of recording medium, and the cyan, magenta and yellow microcapsules 10C, 10M and 10Y included in the drop are selectively compacted and broken by suitably selecting a heating temperature and a breaking pressure, which should be exerted on the drop.

For example, if the selected heating temperature and breaking pressure fall within a hatched cyan-developing area C (FIG. 3), defined by a temperature range between the glass-transition temperatures $T_1$ and $T_2$ and by a pressure range between the critical breaking pressure $P_3$ and the upper limit pressure $P_{UL}$, only the cyan microcapsules 10C are compacted and broken. The cyan leuco-pigment, seeped from the compacted and broken microcapsules 10C, generates cyan by chemically reacting with the color developer, and thus the drop is developed as a cyan dot on the sheet of recording paper.

Also, if the selected heating temperature and breaking pressure fall within a hatched magenta-developing area M, defined by a temperature range between the glass-transition temperatures $T_2$ and $T_3$ and by a pressure range between the critical breaking pressures $P_2$ and $P_3$, only the magenta microcapsules 10M are compacted and broken. The magenta leuco-pigment, seeped from the compacted and broken microcapsules 10M, generates magenta by chemically reacting with the color developer, and thus the drop is developed as a magenta dot on the sheet of recording paper.

Similarly, if the selected heating temperature and breaking pressure fall within a hatched yellow-developing area Y, defined by a temperature range between the glass-transition temperature $T_3$ and the upper limit temperature $T_{UL}$ and by a pressure range between the critical breaking pressures $P_1$ and $P_2$, only the yellow microcapsules 10Y are compacted and broken. The yellow leuco-pigment, seeped from the compacted and broken microcapsules 10Y, generates yellow by chemically reacting with the color developer, and thus the drop is developed as a yellow dot on the sheet of recording paper.

Figure 4:
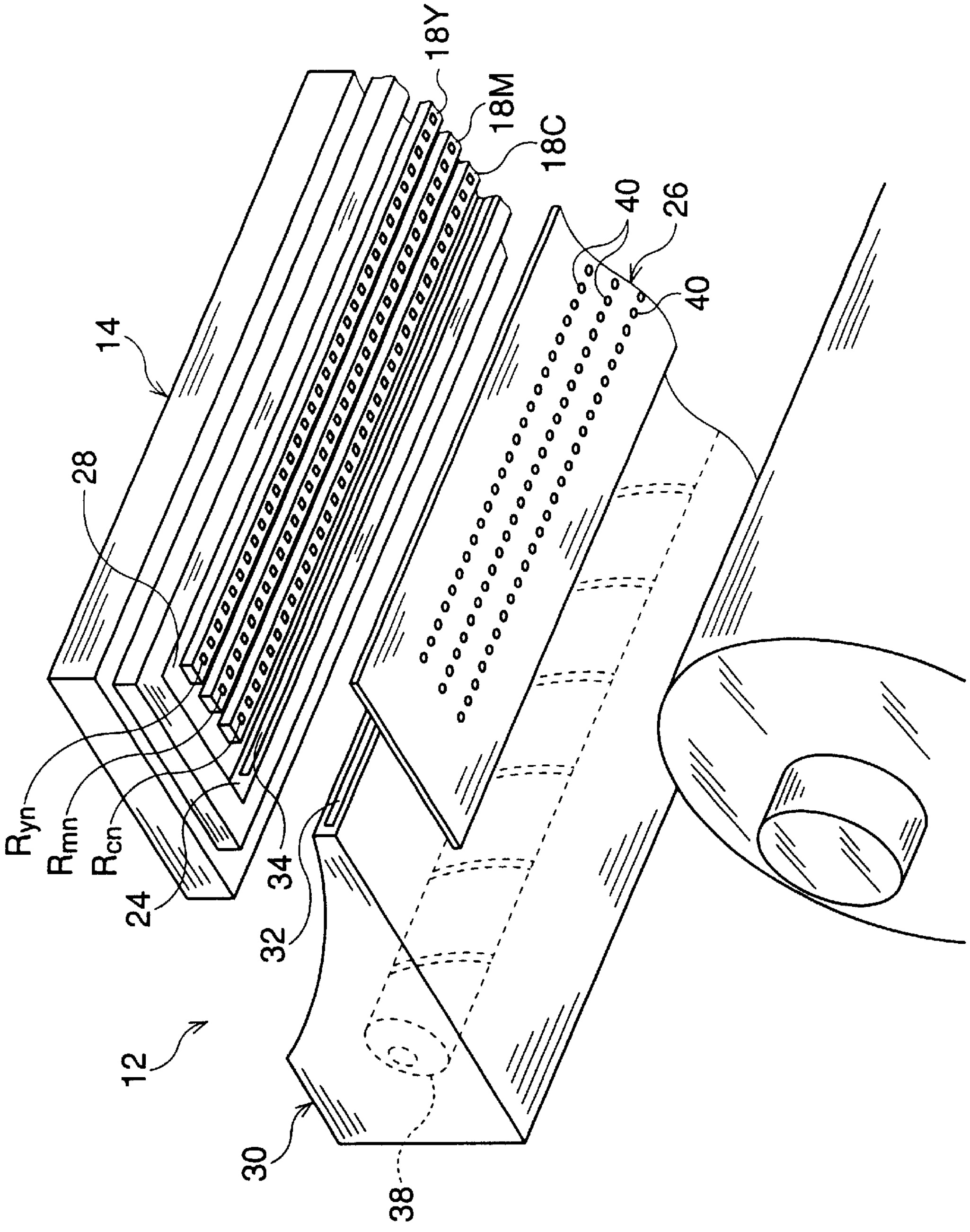
FIG. 4 is a schematic perspective exploded view of a first embodiment of an image-forming apparatus, using the image-forming liquid medium, according to the present invention.
Figure 5:
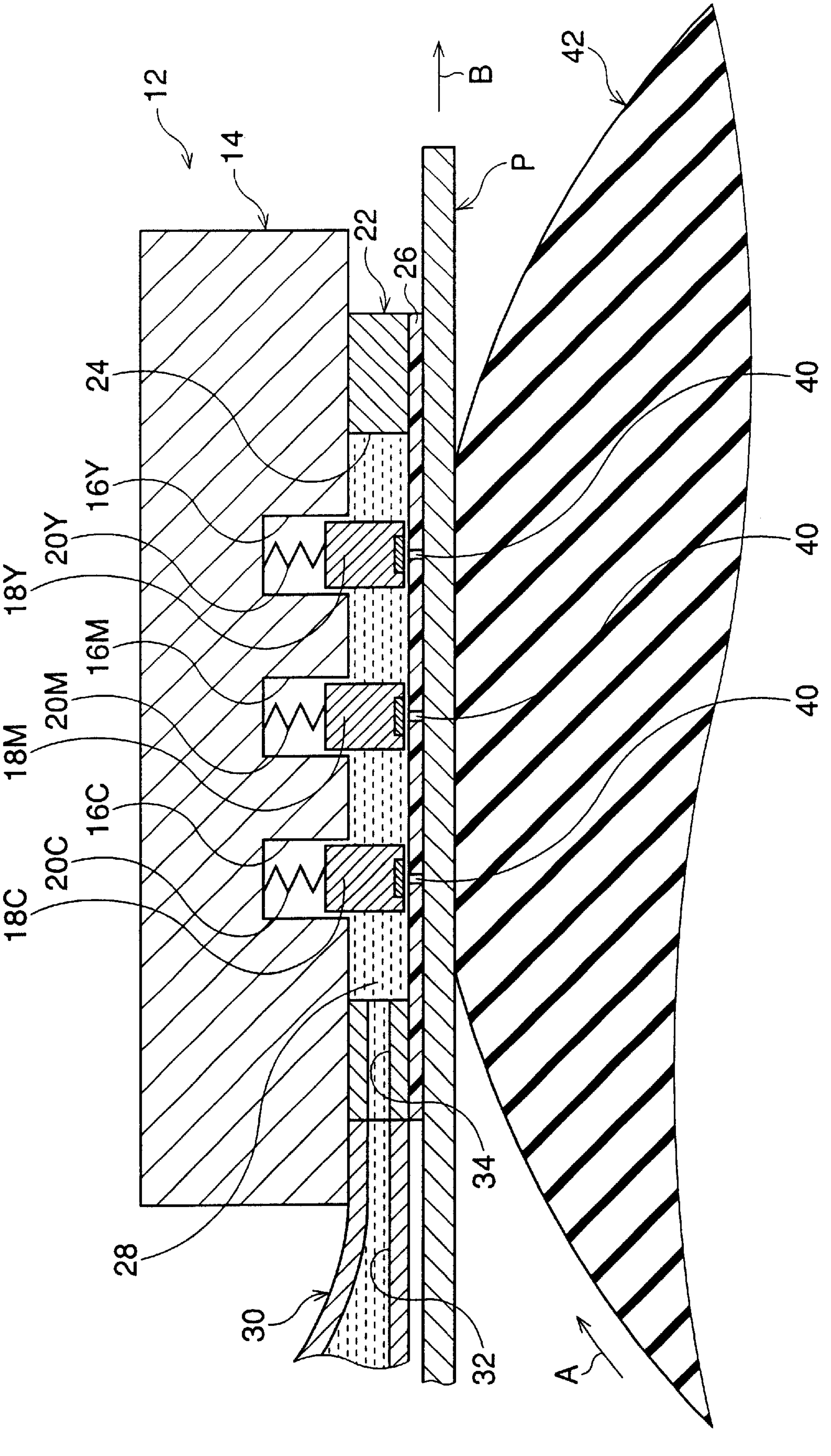
FIG. 5 is a schematic cross-sectional view of the image-foaming apparatus shown in FIG. 4.

FIGS. 4 and 5 schematically show a first embodiment of an image-forming apparatus, using the image-forming liquid medium, which is constituted as a line printer so as to form a color image on a sheet of recording paper.

The printer is provided with a thermal head assembly 12 that includes an elongated rectangular base plate 14 formed of, for example, a suitable ceramic material, with the base plate 14 being formed with three elongated grooves 16C, 16M and 16Y, as shown in FIG. 5. The thermal head assembly 12 also includes three elongated thermal heads 18C, 18M and 18Y, which are slidably accommodated in the elongated grooves 16C, 16M and 16Y, respectively. Each of the thermal heads (18C, 18M, 18Y) is provided with plural spring elements (20C, 20M, 20Y), symbolically shown in FIG. 5, which are confined in the corresponding groove (16C, 16M, 16Y), so as to resiliently act on the corresponding thermal head (18C, 18M, 18Y), so that the thermal head (18C, 18M, 18Y) concerned is elastically biased outward from the corresponding groove (16C, 16M, 16Y). Note, each of the thermal heads 18C, 18M and 18Y may also be formed of a suitable ceramic material.

As best shown in FIG. 4, the thermal head 18C has an array of n electric resistance elements or electric heater elements longitudinally aligned on and embedded in an outer or lower surface thereof, with one of the n electric heater elements being representatively indicated by reference $R_{cn}$. Similarly, the respective thermal heads 18M and 18Y have arrays of n electric heater elements $R_{mn}$ and $S_{yn}$ longitudinally aligned on and embedded in outer or lower surfaces thereof. Note, as is apparent from FIG. 4, the n electric heater elements $R_{cn}$, the n electric heater elements $R_{mn}$ and the n electric heater elements $R_{yn}$ are aligned at a same pitch with respect to each other.

The thermal head assembly 12 further includes an elongated frame or spacer member 22, which is formed with a rectangular opening 24, and which is securely attached to the lower surface of the base plate 14 such that the arrays of electric heater elements $R_{cn}$, $R_{mn}$ and $R_{yn}$ are encompassed by the rectangular opening 24 of the frame or spacer member 22, which may be formed of an electrically insulating material, such as a suitable synthetic resin.

Furthermore, the thermal head assembly 12 includes a sheet of film 26 securely adhered to the frame or spacer member 22 such that the rectangular opening 24 is covered with the film sheet 26, thereby defining a liquid medium space 28, as best shown in FIG. 5. The film sheet 26 may have a thickness of about 0.03 to about 0.08 mm, and is preferably formed of a suitable synthetic resin material, exhibiting a moderate elasticity, a wear-resistant property and a thermal-resistant property. For example, polytetrafluoroethylene can be advantageously used for the film sheet 26.

As shown in FIG. 4, the thermal head assembly 12 is provided with a reservoir 30, in which the above-mentioned image-forming liquid medium is held, such that the liquid medium space 28 is fed with the image-forming liquid medium from the reservoir 30. In particular, the reservoir 30 has an elongated spout 32 formed therein, which is securely joined to a wide passage 34, formed in and extending along one of the longitudinal sides of the frame or spacer member 22, such that the reservoir 30 is in communication with the liquid medium space 28 via the wide passage 34. Thus, the image-forming liquid medium, held in the reservoir 30, can be drawn into the liquid medium space 28, and the liquid medium space 28 is fed and filled with the image-forming liquid medium from the reservoir 30.

Preferably, the reservoir 30 is provided with a roller-type agitator 38 rotatably provided therein, and the agitator 38 is rotationally driven during a printing operation of the printer, thereby ensuring a good homogenous suspension of the cyan, magenta and yellow microcapsules 10C, 10M and 10Y in the image-forming liquid medium held in the reservoir 30. Note, the reservoir 30 is suitably and securely supported by a structural frame (not shown) of the printer.

As best shown in FIG. 4, the film sheet 26 is provided with a plurality of pores 40 formed therein, and these pores 40 are aligned with each other in three rows, and the three respective rows of pores 40 extend below and along the arrays of electric heater elements $R_{cn}$, $R_{mn}$ and $R_{yn}$, such that each heater element ($R_{cn}$, $R_{mn}$, $R_{yn}$) is associated with a corresponding pore 40. Note, in FIGS. 4 and 5, although the pores 40 are exaggeratively illustrated, in reality, the pores 40 are microscopic.

For example, it is possible to produce the film sheet 26, as follows:

Initially, a blank sheet of film is omnidirectionally pulled so as to be elastically expanded, and is then pierced by fine needles or fine lasers, such that a plurality of fine pores (40) is formed in the blank film sheet. Thereafter, the pierced blank film sheet is released from the pulling forces, and is then trimmed or shaped as the film sheet 26 with the pores 40.

Note, when the pierced blank film sheet is released from the pulling forces, the pores 40 usually elastically close, so that the image-forming liquid medium, held in the liquid medium space 28, cannot permeate and penetrate through the pores 40.

Furthermore, as shown in FIG. 4, the printer is provided with a roller platen 42 constituted as a rubber roller, and the roller platen 42 is rotatably provided below and in contact with the film sheet 26 (FIG. 5) such that a rotational axis of the roller platen 42 is in parallel with the arrays of electric heater elements $R_{cn}$, $R_{mn}$ and $R_{yn}$. During a printing operation of the printer, the roller platen 42 is rotated, in a direction indicated by an arrow A in FIG. 5, with a suitable electric motor (not shown), and a sheet of recording paper to be printed, generally indicated by reference P in FIG. 5, is introduced into a nip between the film sheet 26 and the roller platen 42, and is moved in a direction indicated by an arrow B in FIG. 5, due to the recording paper sheet P being subjected to a traction force from the rotating roller platen 42.

A resilient force of the spring elements 20C is set so that the thermal head 18C is elastically pressed against the film sheet 26, backed by the roller platen 42, at a pressure range between the critical breaking pressure $P_3$ and the upper limit pressure $P_{UL}$. Also, a resilient force of the spring elements 20M is set so that the thermal head 18M is elastically pressed against the film sheet 26, backed by the roller platen 42, at a pressure range between the critical breaking pressures $P_2$ and $P_3$. Further, a resilient force of the spring elements 20Y is set so that the thermal head 18Y is elastically pressed against the film sheet 26, backed by the roller platen 42, at a pressure range between the critical breaking pressures $P_1$ and $P_2$.

Figure 6:
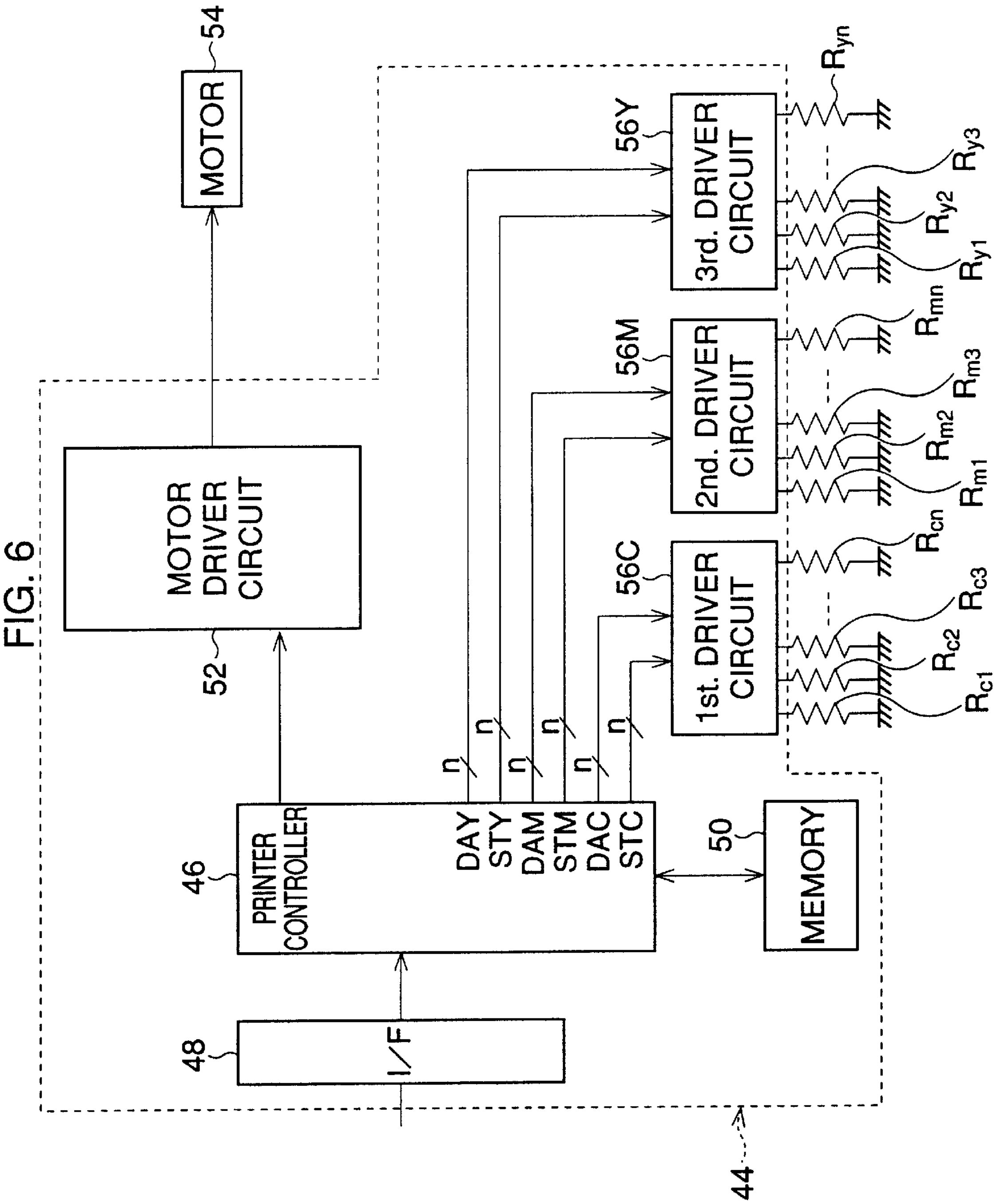
FIG. 6 is a block diagram of a control circuit of the image-forming apparatus shown in FIGS. 4 and 5.

FIG. 6 shows a schematic block diagram of a control circuit 44 for the printer shown in FIGS. 4 and 5. As shown in this drawing, the control circuit 44 comprises a printer controller 46 including a microcomputer. The printer controller 46 receives a series of digital color image-pixel signals from a personal computer or a word processor (not shown) through an interface circuit (I/F) 48. The received digital color image-pixel signals are once stored in a memory 50.

Also, the control circuit 44 is provided with a motor driver circuit 52 for driving an electric motor 54, such as a stepping motor, a servo motor, or the like, which is used to rotationally drive the roller platen 42 in accordance with a series of drive pulses outputted from the motor driver circuit 52. The outputting of the drive pulses from the motor driver circuit 52 to the motor 54 is controlled by the printer controller 46.

As shown in FIG. 6, the control circuit 44 is further provided with a first driver circuit 56C, a second driver circuit 56M and a third driver circuit 56Y, which are controlled by the printer controller 46 to drive the thermal heads 18C, 18M and 18Y, respectively. Namely, the driver circuits 56C, 56M and 56Y are controlled by n sets of strobe signals "STC" and control signals "DAC", n sets of strobe signals "STM" and control signals "DAM", and n sets of strobe signals "STY" and control signals "DAY", respectively, outputted from the printer controller 46, thereby carrying out the selective energization of the heater elements $R_{c1}$ to $R_{cn}$, the selective energization of the heater elements $R_{m1}$ to $R_{mn}$ and the selective energization of the heater elements $R_{y1}$ to $R_{yn}$, as stated in detail below.

Figure 7:
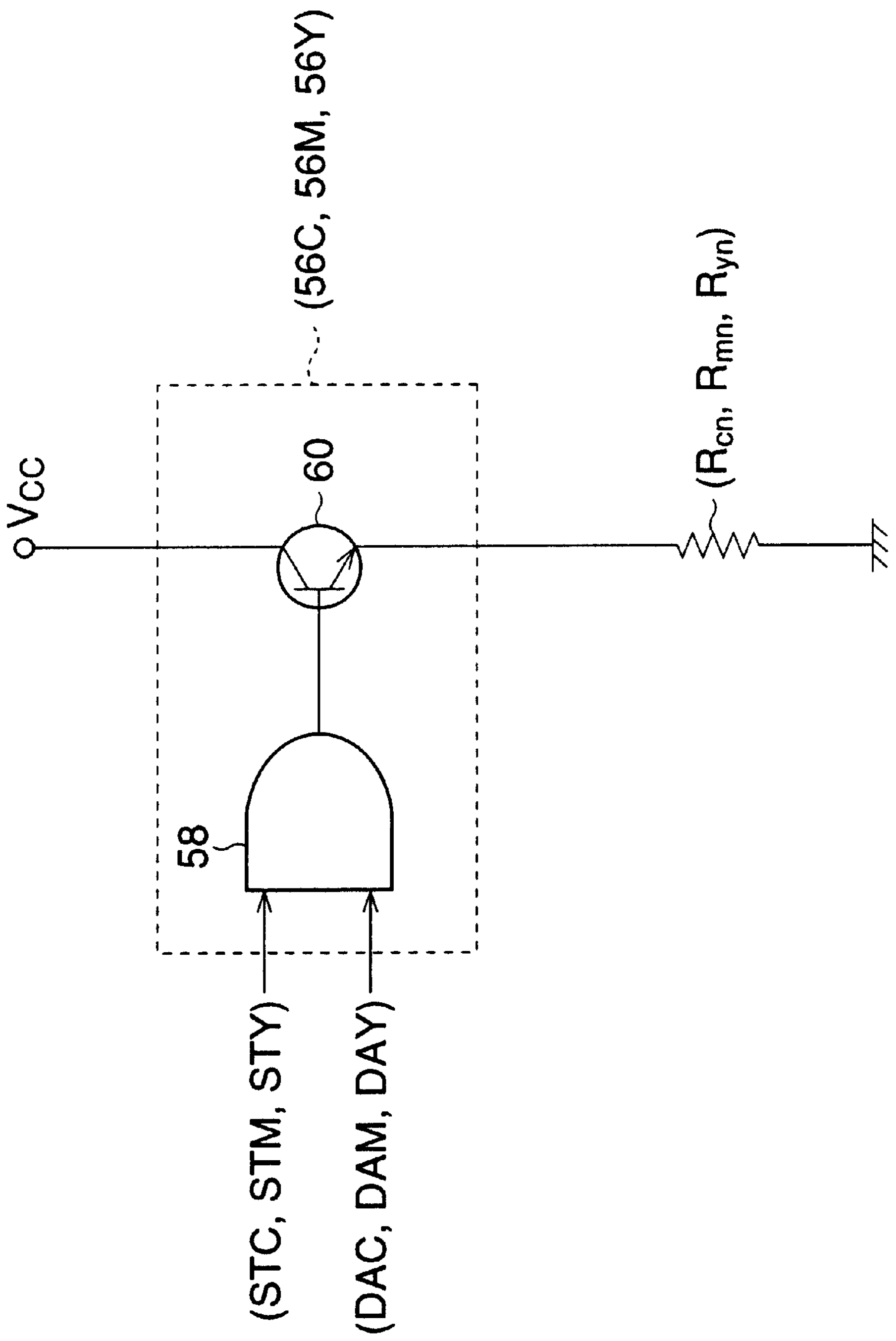
FIG. 7 is a partial block diagram representatively showing a set of an AND-gate circuit and a transistor included in each of first, second and third driver circuits shown in FIG. 6.

In each driver circuit (56C, 56M, 56Y), n sets of AND-gate circuits and transistors are provided with respect to the respective electric heater elements ($R_{cn}$, $R_{mn}$, $R_{yn}$). With reference to FIG. 7, an AND-gate circuit and a transistor in one set are representatively shown and indicated by references 58 and 60, respectively. A set of a strobe signal (STC, STM or STY) and a control signal (DAC, DAM or DAY) is inputted from the printer controller 46 to two input terminals of the AND-gate circuit 58. A base of the transistor 60 is connected to an output terminal of the AND-gate circuit 58; a corrector of the transistor 60 is connected to an electric power source ($V_{cc}$); and an emitter of the transistor 60 is connected to a corresponding electric heater element ($R_{cn}$, $R_{mn}$, $R_{yn}$).

Figure 8:
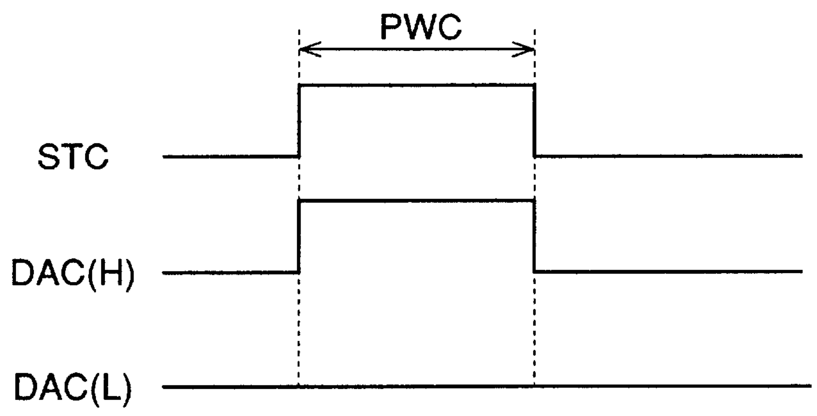
FIG. 8 is a timing chart representatively showing a strobe signal and a control signal for electronically actuating the first driver circuit shown in FIG. 6.

When the AND-gate circuit 58, as shown in FIG. 7, is one included in the first driver circuit 31C, a set of a strobe signal "STC" and a control signal "DAC" is inputted to the input terminals of the AND-gate circuit 58. As shown in a timing chart of FIG. 8, the strobe signal "STC" has a pulse width "PWC". On the other hand, the control signal "DAC" varies in accordance with binary values of a digital cyan image-pixel signal. Namely, when the digital cyan image-pixel signal has a value "1", the control signal "DAC" is outputted as a high-level pulse having the same pulse width as that of the strobe signal "STC", whereas, when the digital cyan image-pixel signal has a value "0", the control signal "DAC" is maintained at a low-level.

Accordingly, only when the digital cyan image-pixel signal has the value "1", is a corresponding transistor (60) switched ON during a period corresponding to the pulse width "PWC" of the strobe signal "STC", so that a corresponding electric heater element ($R_{c1}$ to $R_{cn}$) is electrically energized, whereby the electric heater element concerned is heated to the temperature between the glass-transition temperatures $T_1$ and $T_2$.

Figure 9:
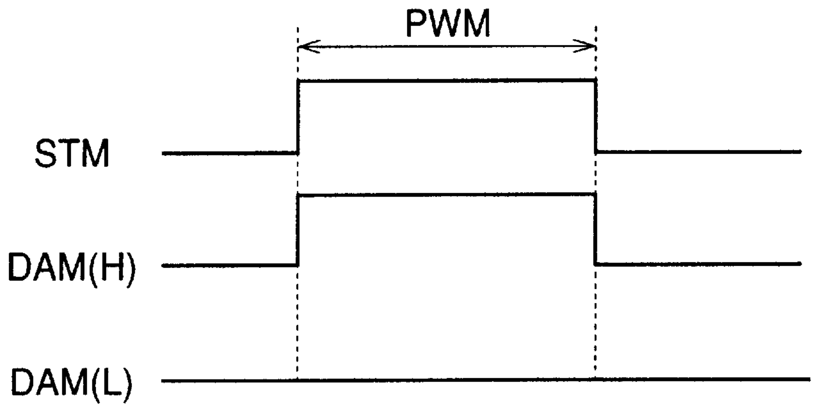
FIG. 9 is a timing chart representatively showing a strobe signal and a control signal for electronically actuating the second driver circuit shown in FIG. 6.

Also, when the AND-gate circuit 58, as shown in FIG. 7, is one included in the second driver circuit 56M, a set of a strobe signal "STM" and a control signal "DAM" is inputted to the input terminals of the AND-gate circuit 58. As shown in a timing chart of FIG. 9, the strobe signal "STM" has a pulse width "PWM", being longer than that of the strobe signal "STC". On the other hand, the control signal "DAM" varies in accordance with binary values of a digital magenta image-pixel signal. Namely, when the digital magenta image-pixel signal has a value "1", the control signal "DAM" is outputted as a high-level pulse having the same pulse width as that of the strobe signal "STM", whereas, when the digital magenta image-pixel signal has a value "0", the control signal "DAM" is maintained at a low-level.

Accordingly, only when the digital magenta image-pixel signal is "1", is a corresponding transistor (60) switched ON during a period corresponding to the pulse width "PWM" of the strobe signal "STM", so that a corresponding electric heater element ($R_{m1}$ to $R_{mn}$) is electrically energized, whereby the electric heater element concerned is heated to the temperature between the glass-transition temperatures $T_2$ and $T_3$.

Figure 10:
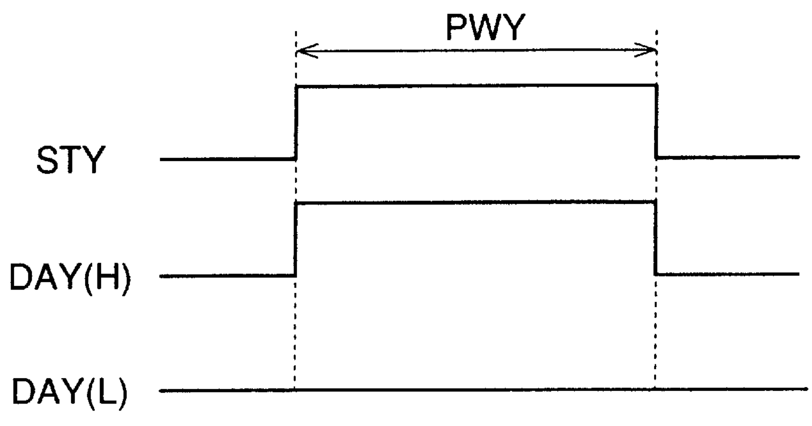
FIG. 10 is a timing chart representatively showing a strobe signal and a control signal for electronically actuating the third driver circuit shown in FIG. 6.

Similarly, when the AND-gate circuit 58, as shown in FIG. 7, is one included in the third driver circuit 56Y, a set of a strobe signal "STY" and a control signal "DAY" is inputted to the input terminals of the AND-gate circuit 58. As shown in a timing chart of FIG. 10, the strobe signal "STY" has a pulse width "PWY", being longer than that of the strobe signal "STM". On the other hand, the control signal "DAY" varies in accordance with binary values of a corresponding digital yellow image-pixel signal. Namely, when the digital yellow image-pixel signal has a value "1", the control signal "DAY" is outputted as a high-level pulse having the same pulse width as that of the strobe signal "STY", whereas, when the digital yellow image-pixel signal has a value "0", the control signal "DAY" is maintained at a low-level.

Accordingly, only when the digital yellow image-pixel signal is "1", is a corresponding transistor (60) switched ON during a period corresponding to the pulse width "PWY" of the strobe signal "STY", so that a corresponding electric heater element ($R_{y1}$ to $R_{yn}$) is electrically energized, whereby the heater element concerned is heated to the temperature between the glass-transition temperature $T_3$ and the upper limit temperature $T_{UL}$.

Figure 11:
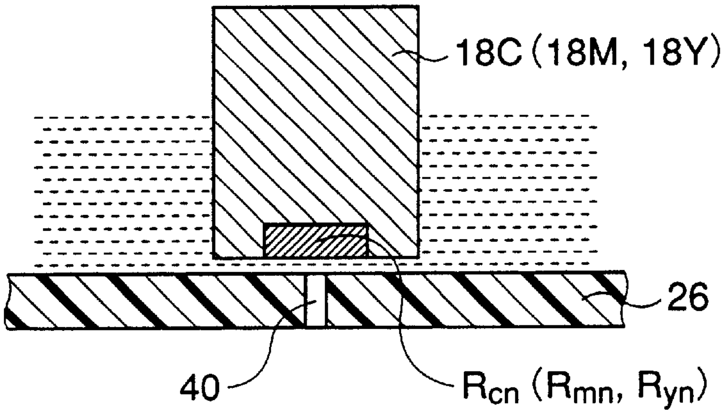
FIG. 11 is a schematic partially-enlarged cross-sectional view of the image-forming apparatus shown in FIGS. 4 and 5, showing a representative first stage of an image-forming operation executed therein.

As conceptually shown in FIG. 11, although an electric heater element ($R_{cn}$, $R_{mn}$, $R_{yn}$) is elastically pressed against the film sheet 26, backed by the roller platen 42, as mentioned above, a small part of the image-forming liquid medium, held in the liquid medium space 28, exists as a fluid film between the electric heater element concerned and the film sheet 26. Note, if necessary, an exposed face of each electric heater element ($R_{cn}$, $R_{mn}$, $R_{yn}$) may be roughly treated, to thereby ensure the existence of the image-forming liquid medium between the electric heater element and the film sheet 26.

Figure 12:
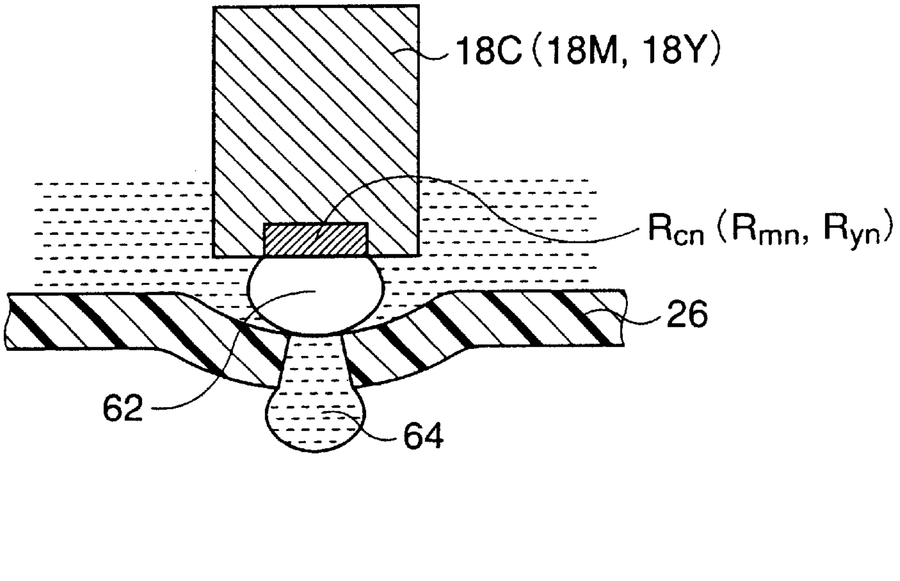
FIG. 12 is a schematic partially-enlarged cross-sectional view, similar to FIG. 11, showing a representative second stage of the image-forming operation executed in the image-forming apparatus shown in FIGS. 4 and 5.

Thus, for example, when one of the electric heater elements $R_{cn}$ is heated by the electrical energization thereof, as mentioned above, a part of the solution component of the image-forming liquid medium in contact with the heated heater element concerned, is vaporized, thereby producing a bubble 62, as conceptually shown in FIG. 12. Also, a local area of the film sheet 26, corresponding to the heated heater element concerned, is heated so that a modulus of elasticity of the heated local area is decreased. As a result, the heated local area of the film sheet 26 inflates due to the decrease in the modulus of elasticity thereof and due to the vapor pressure generated in the bubble 62. Further, a part of the image-forming liquid medium, pressurized by the vapor pressure, can permeate and penetrate into a corresponding pore 40 associated with the heated heater element concerned, and thus the pore 40 is widened, as shown in FIG. 12.

Figure 13:
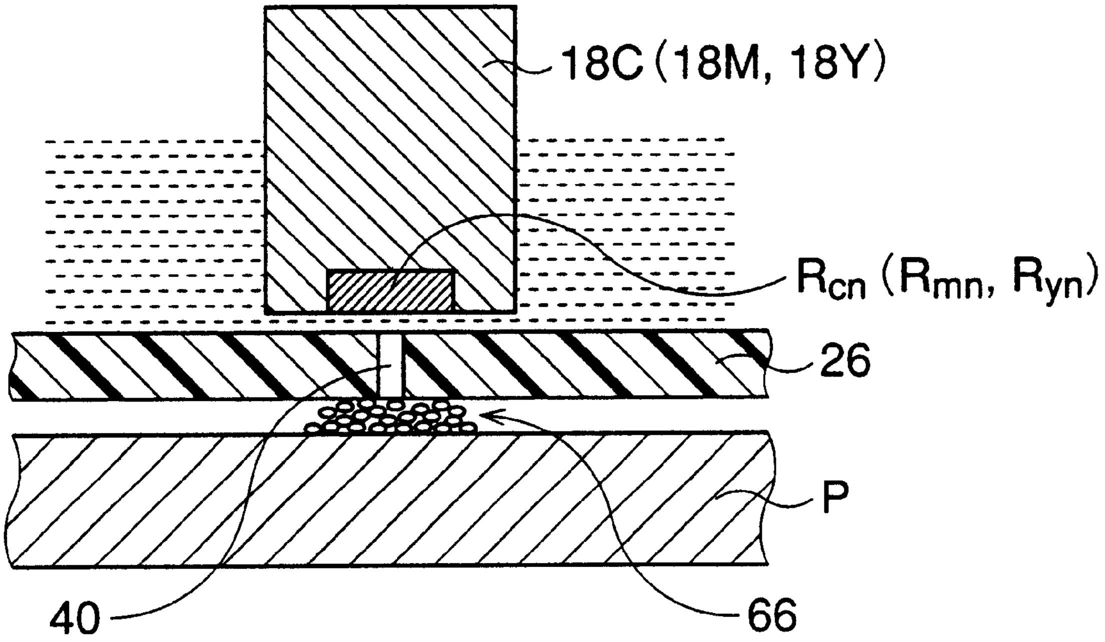
FIG. 13 is a schematic partially-enlarged cross-sectional view, similar to FIG. 11, showing a representative third stage of the image-forming operation executed in the image-forming apparatus shown in FIGS. 4 and 5.

Accordingly, the permeated and penetrated image-forming liquid medium is generated as a fluid drop 64 on the inflated local area, corresponding to the heated heater element concerned, of the film sheet 26 (FIG. 12). If the recording paper sheet P is interposed between the film sheet 26 and the roller platen 42 (FIG. 5), the fluid drop 64 is transferred to the recording paper sheet P, and, as conceptually shown in FIG. 13, only a microcapsule component 66 of the fluid drop is deposited on a surface of the recording paper sheet P, due to a solution component of the fluid drop 64 being absorbed by the recording paper sheet P. Note, in FIG. 13, although the deposited microcapsule component 66 is conveniently shown as a clod on the recording paper sheet P, in reality, a large part of the deposited microcapsule component 66 penetrates the fibrous-tissue surface of the recording paper sheet P.

When the electrical energization of the heater element concerned is stopped, the bubble 62 condenses and the heated and inflated local area of the film sheet 26 is cooled by the surrounding image-forming liquid medium held in the liquid medium space 29, leading to a return to the original condition, as shown in FIG. 11.

As is apparent from the foregoing, since the deposited microcapsule component 66 is subjected to the heating temperature and breaking pressure falling within the hatched cyan-developing area C (FIG. 3), by the electric heater element ($R_{cn}$) concerned, only the cyan microcapsules 10C included in the deposited microcapsule component 66 are compacted and broken, and thus the cyan leuco-pigment, seeped from the compacted and broken microcapsules 10C, is developed as a cyan dot on the recording paper sheet P.

The same is true for the electric heater elements $R_{mn}$ and $R_{yn}$. Namely, when one of the electric heater elements $R_{mn}$ is heated by the electrical energization thereof, a magenta dot is developed on the recording paper sheet P, and, when one of the electric heater elements $R_{yn}$ is heated by the electrical energization thereof, a yellow dot is developed on the recording paper sheet P Note, each of the developed cyan, magenta and yellow dots may have a size of about 50 μm to about 100 μm.

Figure 14:
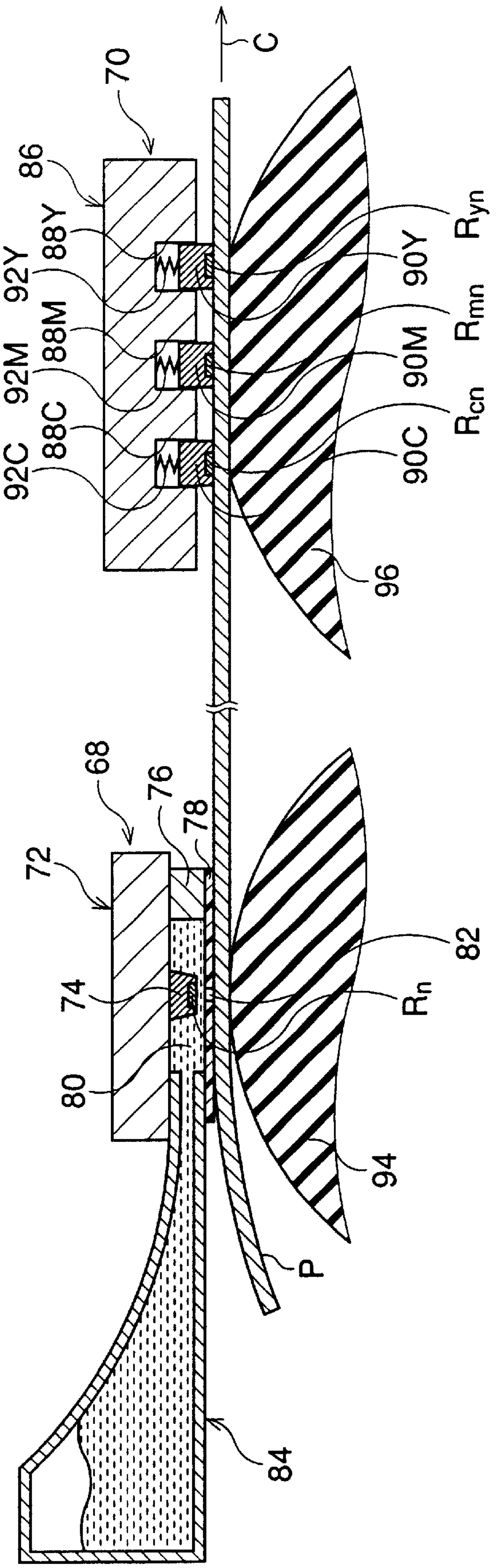
FIG. 14 is a schematic cross-sectional view of a second embodiment of the image-forming apparatus, using the image-forming liquid medium, according to the present invention.

FIG. 14 schematically shows a second embodiment of the image-forming apparatus, using the image-forming liquid medium, which is also constituted as a line printer so as to form a color image on a sheet of recording paper. The printer is provided with a first thermal head assembly 68 and a second thermal head assembly 70, which are aligned with each other so as to define a part of a path through which a sheet of recording paper is passed.

The first thermal head assembly 68 includes an elongated rectangular base plate 72 formed of, for example, a suitable ceramic material, and the base plate 72 has an elongated thermal head 74 securely attached to a lower surface of the base plate 72. The thermal head 74 has an array of n electric resistance elements or electric heater elements longitudinally aligned on and in an outer or lower surface thereof, one of the n electric heater elements being representatively indicated by reference $R_n$ in FIG. 14.

The first thermal head assembly 68 also includes an elongated frame or spacer member 76, which is formed with a rectangular opening, and which is securely attached to the lower surface of the base plate 72 such that the array of electric heater elements $R_n$ is encompassed by the rectangular opening of the frame or spacer member 76, which may be formed of an electrically insulating material, such as a suitable synthetic resin.

The first thermal head assembly 68 further includes a sheet of film 78 securely adhered to the frame or spacer member 76 such that the rectangular opening of the spacer member 76 is covered with the film sheet 78, thereby defining a liquid medium space 80. Similar to the above-mentioned film sheet 26, the film sheet 78 also may have a thickness of about 0.03 to about 0.08 mm, and is preferably formed of a suitable synthetic resin material, such as polytetrafluoroethylene.

The film sheet 78 is provided with a plurality of pores 82 formed therein, and these pores 82 are aligned with each other in a single row, and the row of pores 82 extend below and along the array of electric heater elements $R_n$, such that each heater element ($R_n$) is associated with a corresponding pore 82. Similar to the pores 40 shown in FIGS. 4 and 5, although the pores 82 are exaggeratively illustrated in FIG. 14, in reality, the pores 82 are microscopic. Note, the film sheet 78 having the pores 82 may be produced in substantially the same manner as the film sheet 26.

As shown in FIG. 14, the first thermal head assembly 68 is provided with a reservoir 84, in which the above-mentioned image-forming liquid medium is held, such that the liquid medium space 80 is fed with the image-forming liquid medium from the reservoir 84. Namely, the reservoir 84 is constituted in substantially the same manner as the previous reservoir 30, and is arranged so as to be in communication with the liquid medium space 80 such that the image-forming liquid medium, hold in the reservoir 84, can be drawn into the liquid medium space 80. Note, the reservoir 84 may be provided with a roller-type agitator, as indicated by reference 38 in FIG. 4, thereby ensuring a good homogenous suspension of the cyan, magenta and yellow microcapsules 10C, 10M and 10Y in the image-forming liquid medium held in the reservoir 84.

The second thermal head assembly 70 includes an elongated rectangular base plate 86 formed of, for example, a suitable ceramic material, with the base plate 86 being formed with three elongated grooves 88C, 88M and 88Y, as shown in FIG. 14. The second thermal head assembly 70 also includes three elongated thermal heads 90C, 90M and 90Y, which are slidably accommodated in the elongated grooves 88C, 88M and 88Y, respectively. Each of the thermal heads (90C, 90M, 90Y) is provided with plural spring elements (92C, 92M, 92Y), symbolically shown in FIG. 14, which are confined in the corresponding groove (88C, 88M, 88Y), so as to resiliently act on the corresponding thermal head (90C, 90M, 90Y), so that the thermal head (90C, 90M, 90Y) concerned is elastically biased outward from the corresponding groove (88C, 88M, 88Y). Note, each of the thermal heads 90C, 90M and 90Y also may be formed of a suitable ceramic material.

Each of the thermal heads 90C, 90M and 90Y has an array of n electric resistance elements or electric heater elements longitudinally aligned on and embedded in an outer or lower surface thereof, one of the n electric heater elements 90C, one of the n electric heater elements 90M and one of the electric heater elements 90Y are representatively indicated by references $R_{cn}$, $R_{mn}$ and $R_{yn}$, respectively.

Note, the n electric heater elements $R_n$ of the thermal head 74 of the first thermal head assembly 68 and the n electric heater elements $R_{cn}$, n electric heater elements $R_{mn}$ and n electric heater elements $R_{yn}$ are all aligned at a same pitch with respect to each other.

As is apparent from FIG. 14, the printer is provided with a first roller platen 94 and a second roller platen 96, each of which is constituted as a rubber roller. The first roller platen 94 is rotatably provided below and in contact with the film sheet 78 such that a rotational axis of the roller platen 94 is in parallel with the array of the electric heater elements $R_n$. Also, the second roller platen 96 is rotatably provided below and in contact with the thermal heads 90C, 90M and 90Y, such that a rotational axis of the roller platen 96 is in parallel with the arrays of electric heater elements $R_{cn}$, $R_{mn}$ and $R_{yn}$.

During a printing operation of the printer, the respective platen rollers 94 and 96 are rotated in a clockwise direction (FIG. 14) by suitable electrical motors (not shown), with a same peripheral speed, and a sheet of recording paper to be printed, generally indicated by reference P in FIG. 14, is passed through a nip between the film sheet 78 and the roller platen 94, and then nips between the thermal heads 90C, 90M and 90Y and the roller platen 96, so as to be moved in a direction indicated by an arrow C in FIG. 14, due to the recording paper sheet P being subjected to a traction force from the rotating platen rollers 94 and 96.

Similar to the first embodiment of the printer shown in FIGS. 4 and 5, a resilient force of the spring elements 92C is set so that the thermal head 90C is elastically pressed against the roller platen 96, at a pressure ranging between the critical breaking pressure $P_3$ and the upper limit pressure $P_{UL}$. Also, a resilient force of the spring elements 92M is set so that the thermal head 90M is elastically pressed against the roller platen 96, at a pressure ranging between the critical breaking pressures $P_2$ and $P_3$. Further, a resilient force of the spring elements 92Y is set so that the thermal head 90Y is elastically pressed against the roller platen 96, at a pressure ranging between the critical breaking pressures $P_1$ and $P_2$.

Figure 15:
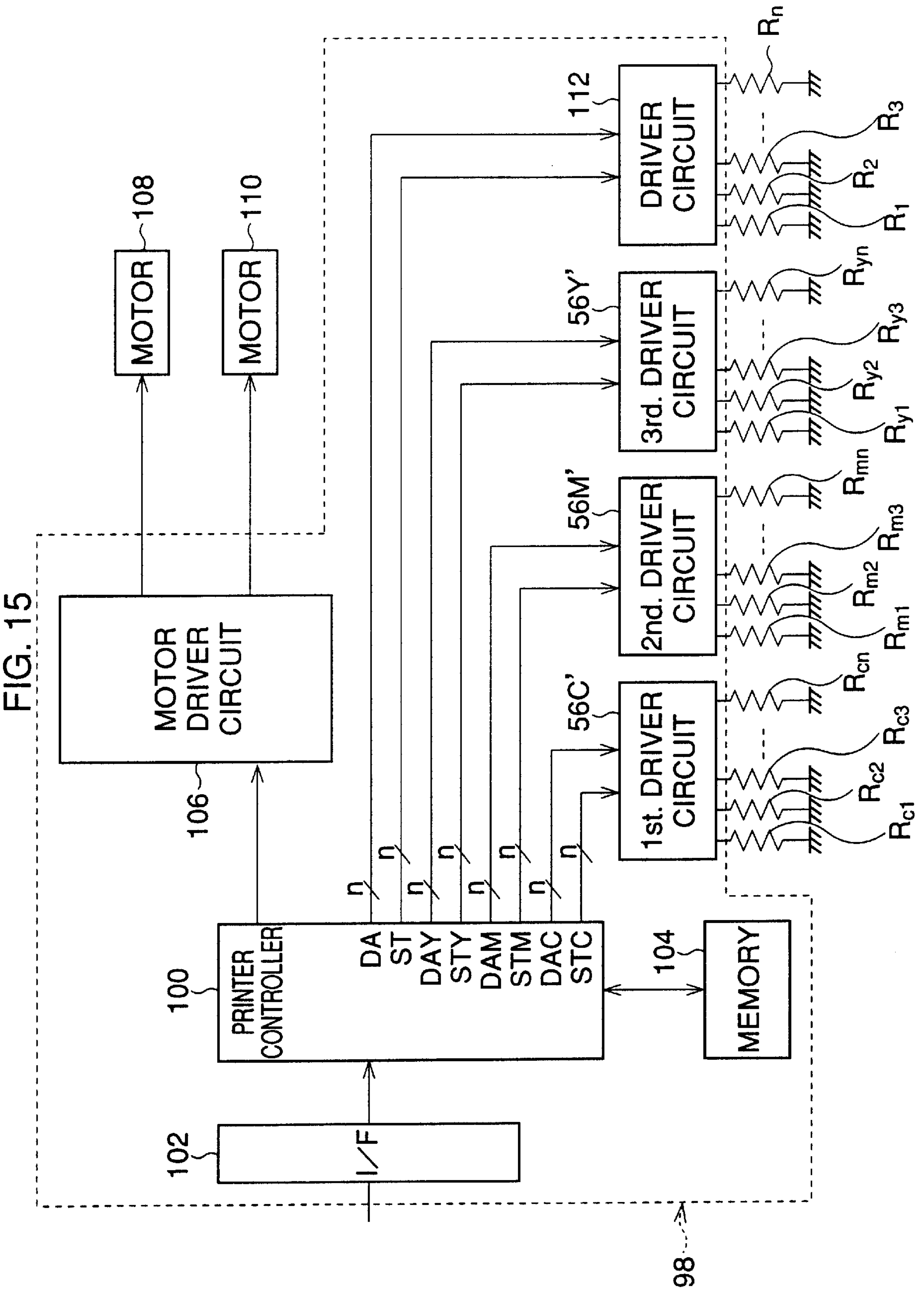
FIG. 15 is a block diagram of a control circuit of the image-forming apparatus shown in FIG. 14.

FIG. 15 shows a schematic block diagram of a control circuit 98 for the printer shown in FIG. 14. As shown in this drawing, the control circuit 98 comprises a printer controller 100 including a microcomputer. The printer controller 100 receives a series of digital color image-pixel signals from a personal computer or a word processor (not shown) through an interface circuit (I/F) 102. The received digital color image-pixel signals are once stored in a memory 104.

Also, the control circuit 98 is provided with a motor driver circuit 106 for driving electric motors 108 and 110, each of which may be a stepping motor, a servo motor, or the like. The respective motors 108 and 110 are used to rotationally drive the roller platens 94 and 96 in accordance with a series of drive pulses outputted from the motor driver circuit 106. The outputting of the drive pulses from the motor driver circuit 106 to the motors 108 and 110 is controlled by the printer controller 100.

As shown in FIG. 15, the control circuit 98 is further provided with a first driver circuit 56C', a second driver circuit 56M' and a third driver circuit 56Y', which are arranged in substantially the same manner as the first, second and third driver circuits 56C, 56M and 56Y of the control circuit 44 shown in FIG. 6, respectively, and which are controlled by the printer controller 100 to drive the respective thermal heads 90C, 90M and 90Y of the second thermal head assembly 70. Namely, the driver circuits 56C', 56M' and 56Y' are controlled by n sets of strobe signals "STC" and control signals "DAC", n sets of strobe signals "STM" and control signals "DAM", and n sets of strobe signals "STY" and control signals "DAY", respectively, outputted from the printer controller 100, thereby carrying out the selective energization of the heater elements $R_{cl}$ to $R_{cn}$, the selective energization of the heater elements $R_{m1}$ to $R_{mn}$ and the selective energization of the heater elements $R_{y1}$ to $R_{yn}$, in substantially the same manner as explained with reference to the timing charts of FIGS. 8, 9 and 10 in the first embodiment of the printer shown in FIGS. 4 and 5.

Furthermore, the control circuit 98 is provided with an additional driver circuit 112, which is arranged in substantially the same manner as each of the first, second and third driver circuits 56C, 56M and 56Y of the control circuit 44 shown in FIG. 6, and which is controlled by the printer controller 100 to drive the thermal head 74 of the first thermal head assembly 68. Namely, the driver circuit 112 includes n sets of AND-gate circuits (58) and transistors (60), as shown in FIG. 7, provided for the respective electric heater elements $R_n$, and is controlled by n sets of strobe signals "ST" and control signals "DA" outputted from the printer controller 100, thereby carrying out the selective energization of the heater elements $R_1$ to $R_n$.

Figure 16:
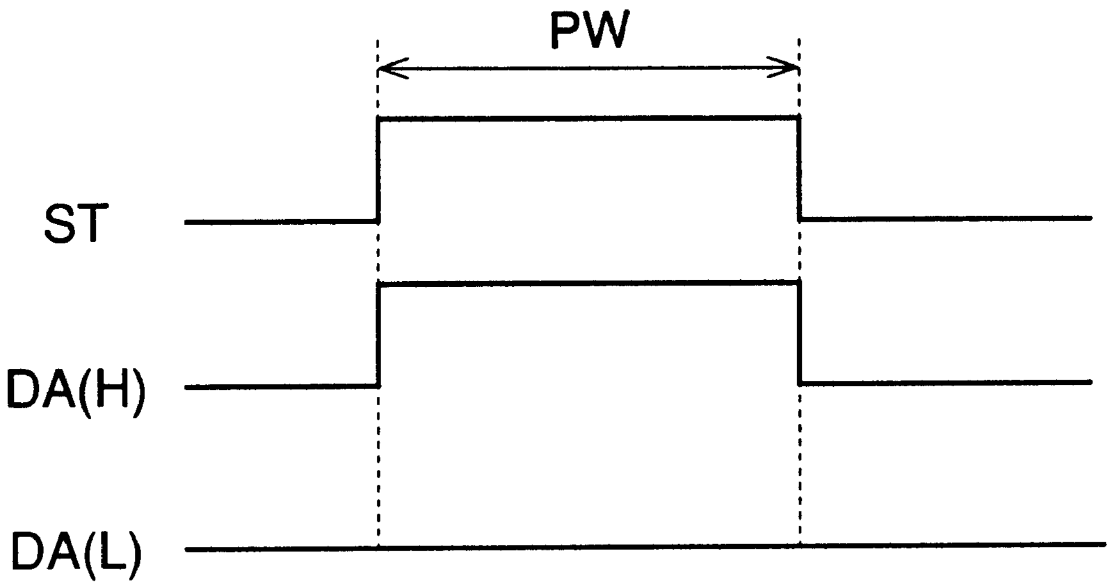
FIG. 16 is a timing chart representatively showing a strobe signal and a control signal for electronically actuating an additional driver circuit shown in FIG. 15.

In particular, a set of a strobe signal ST and a control signal DA is inputted from the printer controller 100 to two input terminals of an AND-gate circuit (58) concerned of the additional driver circuit 112. As shown in a timing chart of FIG. 16, the strobe signal "ST" has a pulse width "PW". On the other hand, the control signal "DA" varies in accordance with a set of a digital cyan image-pixel signal, a digital magenta image-pixel signal and a digital yellow image-pixel signal, which controls respective outputtings of the control signals "DAC", "DAM" and "DAY", corresponding to each other. Namely, when at least one of the digital color (cyan, magenta and yellow) image-pixel signals included in each set has a value "1", the control signal "DA" is outputted as a high-level pulse having the same pulse width as that of the strobe signal "ST", whereas, when all of the digital color (cyan, magenta and yellow) image-pixel signals included in each set have a value "0", the control signal "DA" is maintained at a low-level.

Accordingly, only when the control signal "DA" is outputted as a high-level pulse, is a corresponding transistor (60) switched ON during a period corresponding to the pulse width "PW" of the strobe signal "ST", so that a corresponding electric heater element ($R_1$ to $R_n$) of the thermal head 74 is electrically energized, whereby the electric heater element concerned is heated to a predetermined suitable temperature, which is of course lower than the upper limit temperature $T_{UL}$ (FIG. 3).

Figure 17:
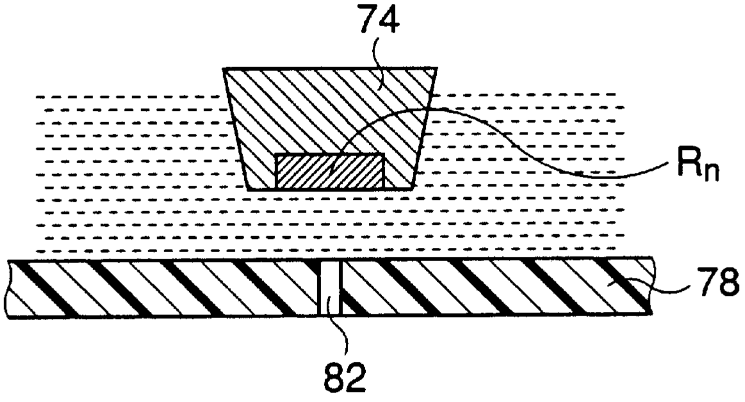
FIG. 17 is a schematic partially-enlarged cross-sectional view of a first thermal head assembly of the image-forming apparatus shown in FIG. 14, showing a representative first stage of an image-forming operation executed in the first thermal head assembly.

When one of the electric heater elements $R_n$ of the thermal head 74 is not electrically energized, a corresponding pore 82 elastically closes, so that the image-forming liquid medium, held in the liquid medium space 80, cannot permeate and penetrate through the pore concerned, as conceptually shown in FIG. 17.

Figure 18:
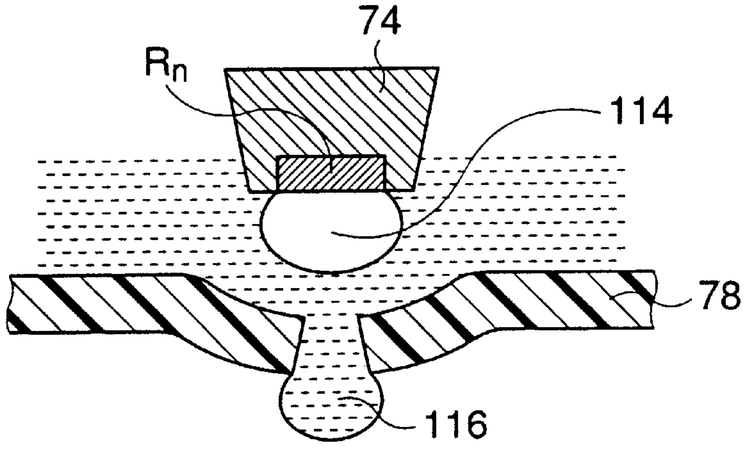
FIG. 18 is a schematic partially-enlarged cross-sectional view, similar to FIG. 17, showing a representative second stage of the image-foaming operation executed in the first thermal head assembly.

On the other hand, when one of the heater elements $R_n$ of the thermal head 74 is heated by the electrical energization thereof, due to at least one digital color (cyan, magenta, yellow) image-pixel signal included in a set having a value "1", as mentioned above, a part of the solution component of the image-forming liquid medium in contact with the heated heater element ($R_n$) concerned, is vaporized, thereby producing a bubble 114, as conceptually shown in FIG. 18. Also, a local area of the film sheet 78, corresponding to the heated heater element ($R_n$) concerned, is heated so that a modulus of elasticity of the heated local area is decreased. As a result, the heated local area of the film sheet 78 inflates due to the decrease in the modulus of elasticity thereof and due to the vapor pressure generated in the bubble 114. Further, a part of the image-forming liquid medium, pressurized by the vapor pressure, can permeate and penetrate into a corresponding pore 82 associated with the heated heater element concerned, and thus the pore 82 is widened, as shown in FIG. 18.

Accordingly, the permeated and penetrated image-forming liquid medium is generated as a fluid drop 116 on the inflated local area, corresponding to the heated heater element concerned, of the film sheet 78 (FIG. 18). If the recording paper sheet P is interposed between the film sheet 78 and the first roller platen 94 (FIG. 14), the fluid drop 116 is transferred to the recording paper sheet P, and, as conceptually shown in FIG. 19, only a microcapsule component 118 of the fluid drop is deposited on the surface of the recording paper sheet P, due to a solution component of the fluid drop 116 being absorbed by the recording paper sheet P. Note, in FIG. 19, although the deposited microcapsule component 118 is conveniently illustrated as a clod on the recording paper sheet P, in reality, a large part of the deposited microcapsule component 118 penetrates the fibrous-tissue surface of the recording paper sheet P.

Figure 19:
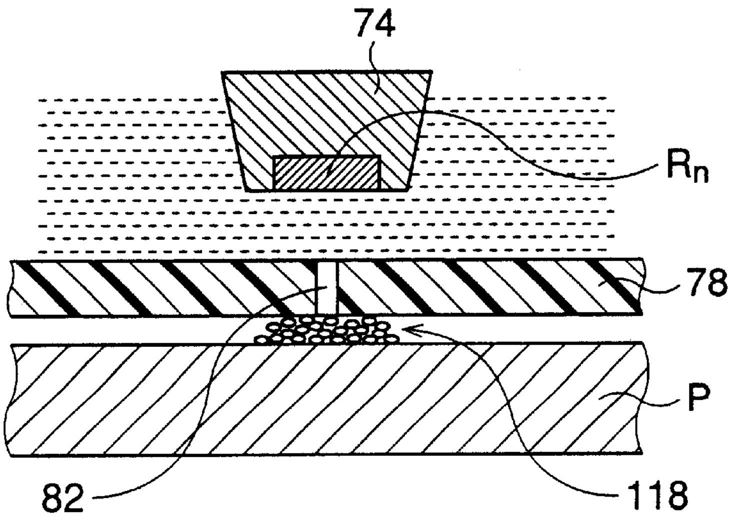
FIG. 19 is a schematic partially-enlarged cross-sectional view, similar to FIG. 17, showing a representative third stage of the image-forming operation executed in the first thermal head assembly.
Figure 20:
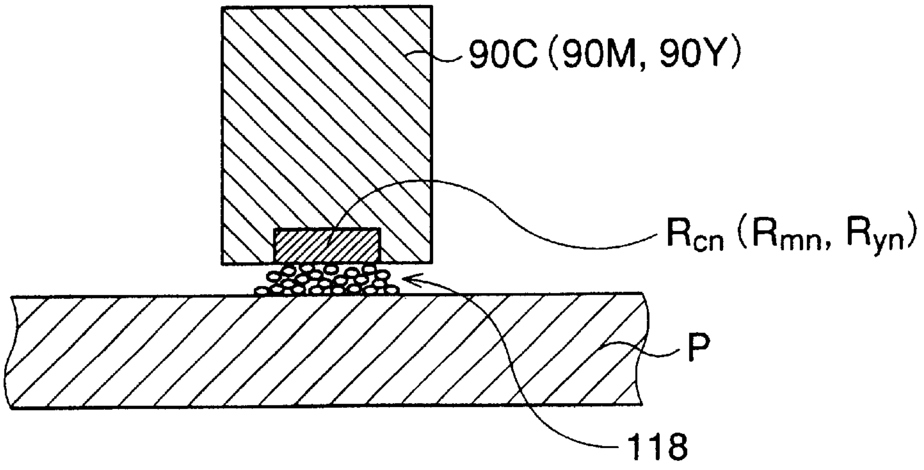
FIG. 20 is a schematic partially-enlarged cross-sectional view of a second thermal head assembly of the image-forming apparatus shown in FIG. 14, showing a representative stage of an image-forming operation executed in the second thermal head assembly.

When the electrical energization of the heater element ($R_n$) concerned is stopped, the bubble 114 condenses and the heated and inflated local area of the film sheet 78 is cooled by the surrounding image-forming liquid medium held in the liquid medium space 80, leading to a return to the original condition, as shown in FIG. 19. Then, the deposited microcapsule component 118 is successively passed through the nips between the thermal heads 90C, 90M and 90Y and the second roller platen 96, due to the movement of the recording paper sheet P.

During the passage of the deposited microcapsule component 118 through the nip between the thermal head 90C and the second roller platen 96, if only the digital cyan image-pixel signal of the digital color image-pixel signals included in the set concerned has a value "1", by a corresponding heater element $R_{cn}$, the deposited microcapsule component 118 is subjected to the heating temperature and breaking pressure that fall within the hatched cyan-developing area C (FIG. 3), so that only the cyan microcapsules 10C included in the deposited microcapsule component 118 are compacted and broken, and thus the cyan leuco-pigment, seeped from the compacted and broken microcapsules 10C, is developed as a cyan dot on the recording paper sheet P.

During the passage of the deposited microcapsule component 118 through the nip between the thermal head 90M and the second roller platen 96, if only the digital magenta image-pixel signal of the digital color image-pixel signals included in the set concerned has a value "1", by a corresponding heater element $R_{mn}$, the deposited microcapsule component 118 is subjected to the heating temperature and breaking pressure that fall within the hatched magenta-developing area M (FIG. 3), so that only the magenta microcapsules 10M included in the deposited microcapsule component 118 are compacted and broken, and thus the magenta leuco-pigment, seeped from the compacted and broken microcapsules 10M, is developed as a magenta dot on the recording paper shoot P.

During the passage of the deposited microcapsule component 118 through the nip between the thermal head 90Y and the second roller platen 96, if only the digital yellow image-pixel signal of the digital color image-pixel signals included in the set concerned has a value "1", by a corresponding heater element $R_{yn}$, the deposited microcapsule component 118 is subjected to the heating temperature and breaking pressure that fall within the hatched yellow-developing area Y (FIG. 3), so that only the yellow microcapsules 10Y included in the deposited microcapsule component 118 are compacted and broken, and thus the yellow leuco-pigment, seeped from the compacted and broken microcapsules 10Y, is developed as a yellow dot on the recording paper sheet P.

Note, of course, if both the digital cyan and magenta image-pixel signals of the digital color image-pixel signals included in the set concerned have a value "1", the deposited microcapsule component 118 is developed as a blue dot on the recording paper sheet P; if both the digital magenta and yellow image-pixel signals of the digital color image-pixel signals included in the set concerned have a value "1", the deposited microcapsule component 118 is developed as a red dot on the recording paper sheet P; if both the digital cyan and yellow image-pixel signals of the digital color image-pixel signals included in the set concerned have a value "1", the deposited microcapsule component 118 is developed as a green dot on the recording paper sheet P; and if all of the digital color image-pixel signals included in the set concerned have a value "1", the deposited microcapsule component 118 is developed as a black dot on the recording paper sheet P.

If only white-colored sheets of recording paper are used, the shape memory resins of the cyan, magenta and yellow microcapsules 10C, 10M and 10Y may be colored with a white pigment. In this case, respective cyan, magenta and yellow dyes or ink, which directly exhibit cyan, magenta and yellow pigmentations, may be encapsulated in the cyan, magenta and yellow microcapsules 10C, 10M and 10Y without the need of a specific color development in the solution.

Finally, it will be understood by those skilled in the art that the foregoing description is of preferred embodiments of the printer, and that various changes and modifications may be made to the present invention without departing from the spirit and scope thereof.

The present disclosure relates to a subject matter contained in Japanese Patent Application No. 10-12136 (filed on Jan. 6, 1998) which is expressly incorporated herein, by reference, in its entirety.

What is claimed is:

1. An image-forming liquid medium comprising:

a solution that contains a surface-active agent;

at least two types of microcapsule, a first type of microcapsule filled with a first dye, and a second type of microcapsule filled with a second dye, said two types of microcapsules being mixed with said solution, wherein said first type of microcapsule exhibits a first pressure/temperature characteristic such that, when said first type of microcapsule is squashed and broken upon being simultaneously subjected to a first predetermined pressure and a first predetermined temperature, said first dye seeps from said squashed and broken microcapsule, and said second type of microcapsule exhibits a second pressure/temperature characteristic such that, when said second type of microcapsule is squashed and broken upon being simultaneously subjected to a second predetermined pressure and a second predetermined temperature, said second dye seeps from said squashed and broken microcapsule, said first predetermined pressure being higher than said second predetermined pressure and said first predetermined temperature being lower than said second predetermined temperature.

2. An image-forming liquid medium as set forth in claim 1, wherein said first type of microcapsule has a first shell wall composed of a first resin which exhibits said first pressure/temperature characteristic, and said second type of microcapsule has a second shell wall composed of a second resin which exhibits said second pressure/temperature characteristic.

3. An image-forming liquid medium as set forth in claim 2, wherein each of said first and second resins exhibit transparency, and each of said first and second dyes exhibit transparency, with said solution exhibiting transparency and further comprising a color developer that reacts with each of said first and second dyes, thereby developing a predetermined monochromatic color.

4. An image-forming liquid medium as set forth in claim 3, wherein said respective first and second dyes comprise a first leuco-pigment and a second leuco-pigment, respectively.

5. An image-forming liquid medium as set forth in claim 1, further comprising a third type of microcapsule filled with a third dye mixed with said solution together with said first and second types of microcapsule, wherein said third type of microcapsule exhibits a third pressure/temperature characteristic such that, when said third type of microcapsule is squashed and broken under a third predetermined pressure at a third predetermined temperature, said third dye seeps from said squashed and broken microcapsule.

6. An image-forming liquid medium as set forth in claim 5, wherein said first type of microcapsule has a first shell wall composed of a first resin which exhibits said first pressure/temperature characteristic, said second type of microcapsule has a second shell wall composed of a second resin which exhibits said second pressure/temperature characteristic, and said third type of microcapsule has a third shell wall composed of a third resin which exhibits said third pressure/temperature characteristic.

7. An image-forming liquid medium as set forth in claim 6, wherein each of said first, second and third resins exhibit transparency, and each of said first, second and third dyes exhibit transparency, with said solution exhibiting transparency and further comprising a color developer that reacts with each of said first, second and third dyes, thereby developing a predetermined monochromatic color.

8. An image-forming liquid medium as set forth in claim 7, wherein said respective first, second and third dyes comprise a first leuco-pigment, a second leuco-pigment and a third leuco-pigment, respectively.

9. An image-forming liquid medium as set forth in claim 5, wherein said first, second, and third dyes exhibit a pigmentation, a magenta pigmentation and a yellow pigmentation, respectively.

10. An image-forming apparatus, using said image-forming liquid medium as set forth in claim 1, comprising:

a transfer unit that selectively transfers a small part of said image-forming liquid medium as a first fluid drop to a sheet of recording medium in accordance with a first digital monochromatic image-pixel signal, corresponding to said first dye, and that selectively transfers a small part of said image-forming liquid medium as a second fluid drop to said sheet of recording medium in accordance with a second digital monochromatic image-pixel signal, corresponding to said second dye; and a pressure/temperature applicator unit that applies said first predetermined pressure and said first predetermined temperature to said first fluid drop, and that applies said second predetermined pressure and said second predetermined temperature to said second fluid drop.

11. An image-forming apparatus as set forth in claim 10, wherein said transfer unit and said pressure/temperature applicator unit are combined with each other as a single thermal head assembly.

12. An image-forming apparatus as set forth in claim 11, further comprising:

a platen member that is associated with said single thermal head assembly, said single thermal head assembly including:

an electrically-insulated base member;

a first movable thermal head provided in said base member and having a first array of heater elements aligned with each other;

a second movable thermal head provided in said base member and having a second array of heater elements aligned with each other, said first array of heater elements being in parallel with said second array of heater elements;

a spacer member, having an opening, securely provided on said base member such that said first and second thermal heads are encompassed by said opening of said spacer member;

a sheet of film that covers said spacer member such that said opening of said spacer member is defined as a liquid medium space that stores said image-forming liquid medium, said sheet of film including a plurality of pores formed therein, said pores being aligned with each other in a first row and a second row, which extend along said first and second arrays of heater elements, respectively, such that each of said heater elements is associated with a corresponding pore, said first fluid drop being produced from one of said pores in said first row by heating a corresponding one of said heater elements in said first array to said first predetermined temperature, said second fluid drop being produced from one of said pores in said second row by heating a corresponding one of said heater elements in said second array to said second predetermined temperature, said platen member urging said first and second thermal heads toward the interposed sheet of film, said sheet of recording medium being interposed between said platen member and said sheet of film during said production of said first and second fluid drops;

a first resilient member that is associated with said first thermal head such that said first thermal head is elastically biased against said sheet of film, backed by said platen member, under said first predetermined pressure; and a second resilient member that is associated with it said second thermal head such that said second thermal head is elastically biased against said sheet of film, backed by said platen member, under said second predetermined pressure.

13. An image-forming apparatus as set forth in claim 12, wherein said single thermal head assembly further includes a reservoir that holds said image-forming liquid medium to feed said liquid medium space with said image-forming liquid medium.

14. An image-forming apparatus, using said image-forming liquid medium as set forth in claim 1, comprising:

a transfer unit that selectively transfers a small part of said image-forming liquid medium as a fluid drop to a sheet of recording medium in accordance with at least one of a first digital monochromatic image-pixel signal and a second digital monochromatic image-pixel signal, which correspond to said first and second dyes, respectively; and a pressure/temperature applicator unit that selectively applies said first predetermined pressure and said first predetermined temperature to said fluid drop in accordance with said first digital monochromatic image-pixel signal, and that applies said second predetermined pressure and said second predetermined temperature to said fluid drop in accordance with said second digital monochromatic image-pixel signal.

15. An image-forming apparatus as set forth in claim 14, wherein said transfer unit is formed as a first thermal head assembly, and said pressure/temperature applicator unit is formed as a second thermal head assembly, said first and second thermal head assemblies being arranged so as to partially define a path along which said sheet of recording medium is moved, said first thermal head assembly being positioned upstream of said second thermal head assembly in a direction of said movement of said sheet of recording medium.

16. An image-forming apparatus as set forth in claim 15, further comprising:

a first platen member that is associated with said transfer unit; and a second platen member that is associated with said pressure/temperature applicator unit, said first thermal head assembly including:

a first electrically-insulated base member;

a thermal head provided in said first electrically-insulated base member and having an array of heater elements aligned with each other;

a spacer member, having an opening, securely provided on said first electrically-insulated base member such that said thermal head is encompassed by said opening of said spacer member;

a sheet of film that covers said spacer member such that said opening of said spacer member is defined as a liquid medium space that stores said image-forming liquid medium, said sheet of film including a plurality of pores formed therein, said pores being aligned with each other in a single row, which extends along said array of heater elements, such that each of said heater elements is associated with a corresponding pore, wherein said first platen member urges said thermal head toward the interposed sheet of film, and said fluid drop is selectively produced from one of said pores by heating a corresponding one of said heater elements in said array to a predetermined temperature in accordance with at least one of said first and second digital monochromatic image-pixel signals, with said sheet of recording medium being interposed between said first platen member and said sheet of film during said production of said fluid drop, said pressure/temperature applicator unit including:

a second electrically-insulated base member;

a first movable thermal head provided in said base member and having a first array of heater elements aligned with each other;

a second movable thermal head provided in said base member and having a second array of heater elements aligned with each other, said first array of heater elements being in parallel with said second array of heater elements, and said second platen member contacting said first and second thermal heads;

a first resilient member that is associated with said first thermal head such that said first thermal head elastically contacts said second platen with said first predetermined pressure, during a passage of said sheet of recording medium carrying said fluid drop through a nip between said second platen member and said elastically-contacted first thermal head, a corresponding one of said heater elements in said first array being selectively heated to said first predetermined temperature in accordance with said first digital monochromatic image-pixel signal; and a second resilient member that is associated with said second thermal head such that said second thermal head elastically contacts said sheet of film with said second predetermined pressure, during a passage of said sheet of recording medium carrying said fluid drop through a nip between said second platen member and said elastically-contacted second thermal head, a corresponding one of said heater elements in said second array being selectively heated to said second predetermined temperature in accordance with said second digital monochromatic image-pixel signal.

17. An image-forming apparatus comprising:

a transfer unit that selectively transfers a small part of an image-forming liquid medium as a fluid drop onto a sheet of recording medium in accordance with at least one of a first digital monochromatic image-pixel signal and a second digital monochromatic image-pixel signal;

a pressure/temperature applicator unit that selectively applies a first predetermined pressure and a first predetermined temperature to said fluid drop in accordance with said first digital monochromatic image-pixel signal, and that applies a second predetermined pressure and a second predetermined temperature to said fluid drop in accordance with said second digital monochromatic image pixel signal;

said transfer unit being formed as a first thermal head assembly, said pressure/temperature applicator unit being formed as a second thermal head assembly, said first and second thermal head assemblies being arranged so as to partially define a path along which a sheet of recording medium is moved, said first thermal head assembly being positioned upstream of said second thermal head assembly in a direction of movement of the sheet of recording medium;

said image-forming liquid medium comprising:

a solution that contains a surface active agent;

at least two types of microcapsules, a first type of microcapsule filled with a first dye, and a second type of microcapsule filled with a second dye, said two types of microcapsules being mixed with said solution;

wherein said first type of microcapsule exhibits a first pressure/temperature characteristic such that, when said first type of microcapsule is squashed and broken upon being subjected to a first predetermined pressure at a first predetermined temperature, said first dye seeps from said squashed and broken microcapsule, and said second type of microcapsule exhibits a second pressure/temperature characteristic, such that, when said second type of microcapsule is squashed and broken upon being subjected to a second predetermined pressure at a second predetermined temperature, said second dye seeps from said squashed and broken microcapsule, said first digital monochromatic image pixel signal corresponding to said first dye and said second digital monochromatic image pixel signal corresponding to said second dye.

18. The image-forming apparatus according to claim 17, wherein said first type of microcapsule has a first shell wall comprising a first resin which exhibits said first pressure/temperature characteristic, and said second type of microcapsule has a second shell wall comprising a second resin which exhibits said second pressure/temperature characteristic.

19. The image-forming liquid medium according to claim 1, each said first predetermined temperature and said second predetermined temperature being above an ambient temperature, each said first predetermined pressure and said second predetermined pressure being above an ambient pressure.

20. The image-forming apparatus according to claim 17, each said first predetermined temperature and said second predetermined temperature being above an ambient temperature, each said first predetermined pressure and said second predetermined pressure being above an ambient pressure.

* * * * *